US012717404B1

(12) United States Patent
Edwin et al.

(10) Patent No.: US 12,717,404 B1
(45) Date of Patent: Aug. 25, 2026

(54) GAZE-BASED CALIBRATION PATTERNS FOR OPTICAL SYSTEMS

(71) Applicant: Apple Inc., Cupertino, CA (US)

(72) Inventors: Lionel E Edwin, San Jose, CA (US); Malcolm J Northcott, Santa Cruz, CA (US); Tom Sengelaub, Oakland, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 18/507,994

(22) Filed: Nov. 13, 2023

Related U.S. Application Data

(60) Provisional application No. 63/476,866, filed on Dec. 22, 2022.

(51) Int. Cl.
*G06F 3/01* (2006.01)
*G01B 11/25* (2006.01)
*G06V 10/141* (2022.01)

(52) U.S. Cl.
CPC .............. *G06F 3/013* (2013.01); *G01B 11/25* (2013.01); *G06V 10/141* (2022.01)

(58) Field of Classification Search
None
See application file for complete search history.

(56) References Cited

U.S. PATENT DOCUMENTS 10,732,427 B2 8/2020 Wall et al.
10,802,585 B2 10/2020 Agaoglu et al.
11,175,457 B1 * 11/2021 Trail ...................... G02B 6/122
11,237,628 B1 2/2022 Sharma et al.
11,297,289 B2 * 4/2022 Lu ........................ G03B 21/006
11,333,895 B1 5/2022 Ginzburg et al.
11,520,152 B1 12/2022 Lau et al.
11,619,809 B2 * 4/2023 Kubala .............. G02B 27/0172 345/633
11,747,624 B2 9/2023 Klug et al.
11,763,779 B1 9/2023 Kalinowski et al.
11,803,238 B1 * 10/2023 Tesdahl ................... G06F 3/013
11,860,439 B1 1/2024 Hossain et al.
12,474,232 B2 * 11/2025 Hödlmoser ............... G06T 7/74
2019/0187482 A1 * 6/2019 Lanman ............... G02B 26/105

(Continued)

OTHER PUBLICATIONS

U.S. Appl. No. 17/203,612, filed Mar. 16, 2021.

*Primary Examiner* — Talha M Nawaz
(74) *Attorney, Agent, or Firm* — Treyz Law Group, P.C.; Michael H. Lyons

(57) ABSTRACT

An electronic device may have projectors, waveguides, and a bridge sensor. The projectors may generate calibration patterns in image light provided to the waveguides. The sensor may generate sensor data from the calibration patterns that is used to detect and correct for optical misalignment. A gaze tracking sensor may generate gaze information using transmitted and reflected infrared light. The gaze information may include a gaze direction, a blind spot location, blink information, and/or saccade information. The projector may place the calibration pattern at a location in a field of view of the image light that is separated from the gaze direction, may place the calibration pattern at the blind spot location, may synchronize the calibration pattern with a blink, and/or may synchronize the calibration pattern with a saccade. This may help to hide the calibration pattern from being viewable or perceivable by a user.

14 Claims, 16 Drawing Sheets

(56) References Cited

U.S. PATENT DOCUMENTS

| | | | | |
|---|---|---|---|---|
| 2022/0344907 | A1* | 10/2022 | Shi | H01S 5/041 |
| 2022/0350153 | A1 | 11/2022 | Takashima | |
| 2023/0011557 | A1 | 1/2023 | Park et al. | |
| 2023/0057524 | A1 | 2/2023 | Stipe et al. | |
| 2023/0335518 | A1* | 10/2023 | Lei | H10H 20/018 |
| 2025/0172812 | A1* | 5/2025 | Smits | H04N 13/363 |

* cited by examiner

GAZE-BASED CALIBRATION PATTERNS FOR OPTICAL SYSTEMS

This application claims the benefit of U.S. Provisional Patent Application No. 63/476,866, filed Dec. 22, 2022, which is hereby incorporated by reference herein in its entirety.

FIELD

This relates generally to electronic devices, and, more particularly, to electronic devices such as head-mounted devices.

BACKGROUND

Electronic devices have components such as displays and other optical components. During operation, there is a risk that components may become misaligned with respect to each other due to drop events and other undesired high-stress events. This poses challenges for ensuring satisfactory component performance.

SUMMARY

A head-mounted device such as a pair of glasses may have a head-mounted housing. The head-mounted device may include displays such as projector displays and may include associated optical components. The housing may have a first portion, a second portion, and a nose bridge that couples the first portion to the second portion. A first display having a first projector and a first waveguide may be mounted in the first portion of the housing. A second display having a second projector and a second waveguide may be mounted in the second portion of the housing.

An optical bridge sensor may be disposed in the nose bridge and may couple the first waveguide to the second waveguide. The first and second projectors may generate frames of calibration patterns in the image light. The optical bridge sensor may receive the image light through the waveguides and may generate sensor data based on the calibration patterns in the image light. The projectors may adjust the image light to mitigate optical misalignments identified by the sensor data. The projectors may implement gaze-based obfuscation techniques to help prevent the calibration patterns from being visible or perceivable to a user at the eye boxes.

For example, the device may include a gaze tracking sensor having one or more infrared emitters and one or more infrared sensors. The infrared emitters may emit infrared light and the infrared sensors may generate gaze information based on a version of the infrared light that has reflected off the user's eyes at the eye boxes. The gaze information may include a gaze direction, a location of an ocular blind spot, information identifying a blink, and/or information identifying a saccade. The projector may place the calibration pattern within a portion of the field of view of the image light that is separated from the gaze direction, may place the calibration pattern within the ocular blind spot, may synchronize transmission of the calibration pattern with the blink, and/or may synchronize transmission of the calibration pattern with the saccade. This may help to hide the calibration pattern from being viewable or perceivable to the user.

DETAILED DESCRIPTION

A system may include one or more electronic devices. Each device may contain optical components and other components. During operation, the positions of these components and the devices may be monitored using position sensors. Using position information from the sensors and/or other sensor data, devices in the system may coordinate operation, may perform calibration operations to compensate for measured component misalignment, and/or may take other actions.

Figure 1:
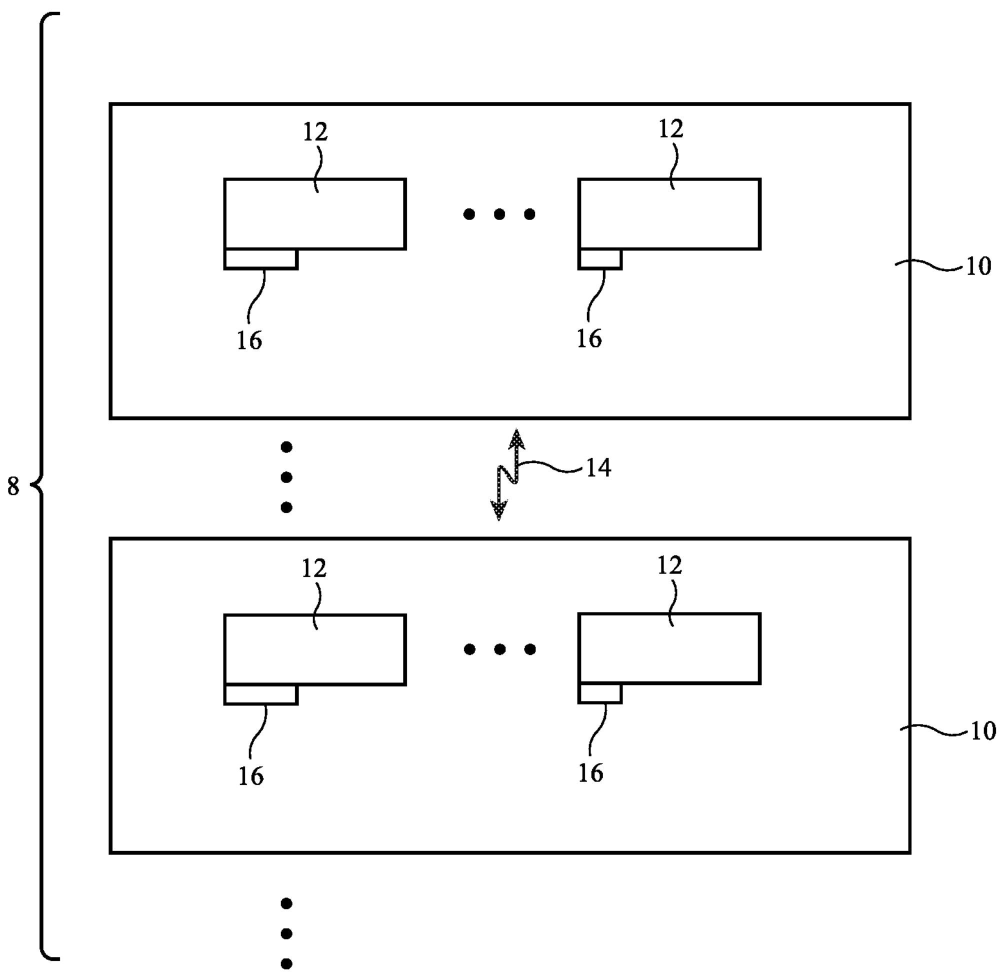
FIG. 1 is a diagram of an illustrative system in accordance with some embodiments.

FIG. 1 is a schematic diagram of an illustrative system of the type that may include one or more electronic devices with position sensors. As shown in FIG. 1, system 8 may include electronic devices 10. Devices 10 may include head-mounted devices (e.g., goggles, glasses, helmets, and/or other head-mounted devices), cellular telephones, tablet computers, peripheral devices such as headphones, game controllers, and/or other input devices. Devices 10 may, if desired, include laptop computers, computer monitors containing embedded computers, desktop computers, media players, or other handheld or portable electronic devices, smaller devices such as wristwatch devices, pendant devices, ear buds, or other wearable or miniature devices, televisions, computer displays that do not contain embedded computers, gaming devices, remote controls, embedded systems such as systems in which equipment is mounted in a kiosk, in an automobile, airplane, or other vehicle, removable external cases for electronic equipment, straps, wrist bands or head bands, removable covers for electronic devices, cases or bags that receive and carry electronic equipment and other items, necklaces or arm bands, wallets, sleeves, pockets, or other structures into which electronic equipment or other items may be inserted, part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, system 8 includes a head-mounted device such as a pair of glasses (sometimes referred to as augmented reality glasses). System 8 may also include peripherals such as headphones, game controllers, and/or other input-output devices (as examples). In some scenarios, system 8 may include one or more stand-alone devices 10. In other scenarios, multiple devices 10 in system 8 exchange information using wired and/or wireless links, which allows these devices 10 to be used together. For example, a first of devices 10 may gather user input or other input that is used to control a second of devices 10 (e.g., the first device may be a controller for the second device). As another example, a first of devices 10 may gather input that is used in controlling a second device 10 that, in turn, displays content on a third device 10.

Devices 10 may include components 12. Components 12 may include control circuitry. The control circuitry may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in the control circuitry may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, graphics processing units (GPUs), central processing units (CPUs), etc.

To support communications between devices 10 and/or to support communications between equipment in system 8 and external electronic equipment, devices 10 may include wired and/or wireless communications circuitry. The communications circuitry of devices 10, which may sometimes be referred to as control circuitry and/or control and communications circuitry, may include antennas, radio-frequency transceiver circuitry, and other wireless communications circuitry and/or wired communications circuitry. The communications circuitry of devices 10 may, for example, support bidirectional wireless communications between devices 10 over wireless links such as wireless link 14 (e.g., a wireless local area network link, a near-field communications link, or other suitable wired or wireless communications link such as a Bluetooth® link, a WiFi® link, a 60 GHz link or other millimeter wave link, etc.). Components 12 may also include power circuits for transmitting and/or receiving wired and/or wireless power and may include batteries.

Components 12 may include input-output devices. The input-output devices may be used in gathering user input, in gathering information on the environment surrounding the user, and/or in providing a user with output. The input-output devices may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, and/or other sensors. In some arrangements, devices 10 may use sensors and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Components 12 may include haptic output devices. The haptic output devices can produce motion that is sensed by the user (e.g., through the user's head, hands, or other body parts). Haptic output devices may include actuators such as electromagnetic actuators, motors, piezoelectric actuators, electroactive polymer actuators, vibrators, linear actuators, rotational actuators, actuators that bend bendable members, etc.

If desired, input-output devices in components 12 may include other devices such as displays (e.g., to display images for a user), status indicator lights (e.g., a light-emitting diode that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), etc.

As shown in FIG. 1, sensors such as position sensors 16 may be mounted to one or more of components 12. Position sensors 16 may include accelerometers, magnetic sensors such as compass sensors, gyroscopes, and/or inertial measurement units (IMUs) that contain some or all of these sensors. Position sensors 16 may be used to measure location (e.g., location along X, Y, and Z axes), orientation (e.g., angular orientation around the X, Y, and Z axes), and/or motion (changes in location and/or orientation as a function of time). Sensors such as position sensors 16 that can measure location, orientation, and/or motion may sometimes be referred to herein as position sensors, motion sensors, and/or orientation sensors.

Devices 10 may use position sensors 16 to monitor the position (e.g., location, orientation, motion, etc.) of devices 10 in real time. This information may be used in controlling one or more devices 10 in system 8. As an example, a user may use a first of devices 10 as a controller. By changing the position of the first device, the user may control a second of devices 10 (or a third of devices 10 that operates in conjunction with a second of devices 10). As an example, a first device may be used as a game controller that supplies user commands to a second device that is displaying an interactive game.

Devices 10 may also use position sensors 16 to detect any changes in position of components 12 with respect to the housings and other structures of devices 10 and/or with respect to each other. For example, a given one of devices 10 may use a first position sensor 16 to measure the position of a first of components 12, may use a second position sensor 16 to measure the position of a second of components 12, and may use a third position sensor 16 to measure the position of a third of components 12. By comparing the measured positions of the first, second, and third components (and/or by using additional sensor data), device 10 can determine whether calibration operations should be performed, how calibration operations should be performed, and/or when/how other operations in device 10 should be performed.

Figure 2:
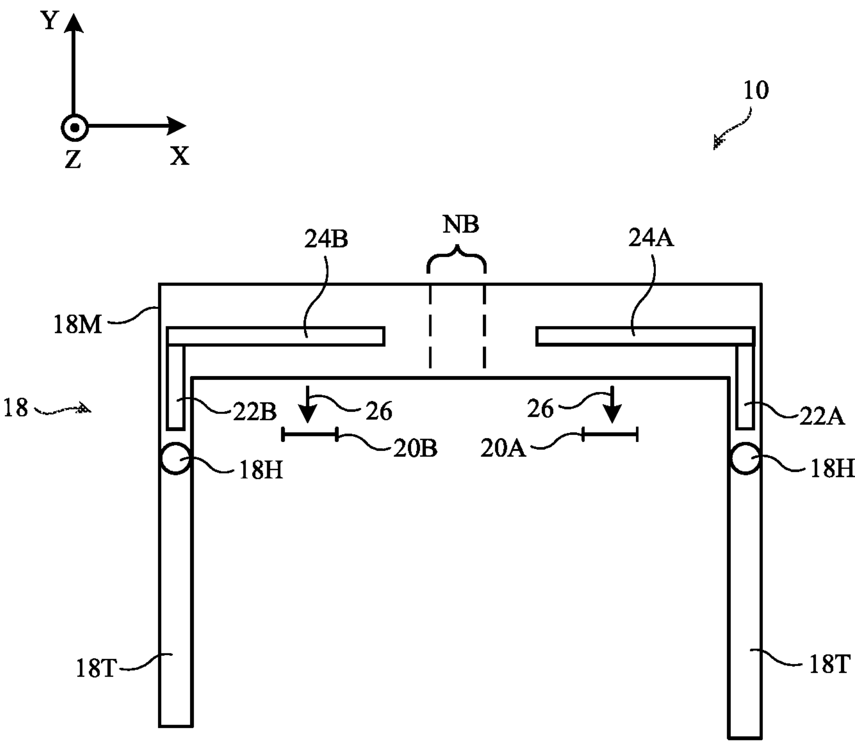
FIG. 2 is a top view of an illustrative head-mounted device in accordance with some embodiments.

In an illustrative configuration, devices 10 include a head-mounted device such as a pair of glasses (sometimes referred to as augmented reality glasses). A top view of device 10 in an illustrative configuration in which device 10 is a pair of glasses is shown in FIG. 2. A shown in FIG. 2, device 10 may include housing 18. Housing 18 may include a main portion (sometimes referred to as a glasses frame) such as main portion 18M and temples 18T that are coupled to main portion 18M by hinges 18H. Nose bridge portion NB may have a recess that allows housing 18 to rest on a nose of a user while temples 18T rest on the user's ears.

Images may be displayed in eye boxes 20 using displays 22 and waveguides 24. Displays 22 may sometimes be referred to herein as projectors 22, projector displays 22, display projectors 22, light projectors 22, image projectors 22, light engines 22, or display modules 22. Projector 22 may include a first projector 22B (sometimes referred to herein as left projector 22B) and a second projector 22A (sometimes referred to herein as right projector 22A). Projectors 22A and 22B may be mounted at opposing right and left edges of main portion 18M of housing 18, for example. Eye boxes 20 may include a first eye box 20B (sometimes referred to herein as left eye box 20B) and may include a second eye box 20A (sometimes referred to herein as right eye box 20A). Waveguides 24 may include a first waveguide 24B (sometimes referred to herein as left waveguide 24B) and a second waveguide 24A (sometimes referred to herein as right waveguide 24A). Main portion 18M of housing 18 may, for example, have a first portion that includes first projector 22B and first waveguide 24B and a second portion that includes second projector 22A and second waveguide 24A (e.g., where nose bridge NB separates the first and second portions such that the first portion is at a first side of the nose bridge and the second portion is at a second side of the nose bridge).

Waveguides 24 may each include one or more stacked substrates (e.g., stacked planar and/or curved layers sometimes referred to herein as waveguide substrates) of optically transparent material such as plastic, polymer, glass, etc. If desired, waveguides 24 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguides 24 may include holographic phase gratings such as volume holograms or thin-film holograms, meta-gratings, or any other desired diffractive grating structures. The diffractive gratings on waveguides 24 may also include surface relief gratings (SRGs) formed on one or more surfaces of the substrates in waveguides 24, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Waveguides 24 may have input couplers that receive light from projectors 22. This image light is then guided laterally (along the X axis) within waveguides 24 in accordance with the principal of total internal reflection. Each waveguide 24 may have an output coupler in front of a respective eye box 20. The output coupler couples the image light out of the waveguide 24 and directs an image towards the associated eye box 20 for viewing by a user (e.g., a user whose eyes are located in eye boxes 20), as shown by arrows 26. Input and output couplers for device 10 may be formed from diffractive gratings (e.g., surface relief gratings, volume holograms, etc.) and/or other optical structures.

For example, as shown in FIG. 2, first projector 22B may emit (e.g., produce, generate, project, or display) image light that is coupled into first waveguide 24B (e.g., by a first input coupler on first waveguide 24B). The image light may propagate in the +X direction along first waveguide 24B via total internal reflection. The output coupler on first waveguide 24B may couple the image light out of first waveguide 24B and towards first eye box 20B (e.g., for view by the user's left eye at first eye box 20B). Similarly, second projector 22A may emit (e.g., produce, generate, project, or display) image light that is coupled into second waveguide 24A (e.g., by a second input coupler on second waveguide 24A). The image light may propagate in the –X direction along second waveguide 24A via total internal reflection. The output coupler on second waveguide 24A may couple the image light out of second waveguide 24A and towards second eye box 20A (e.g., for view by the viewer's right eye at second eye box 20A).

Figure 3:
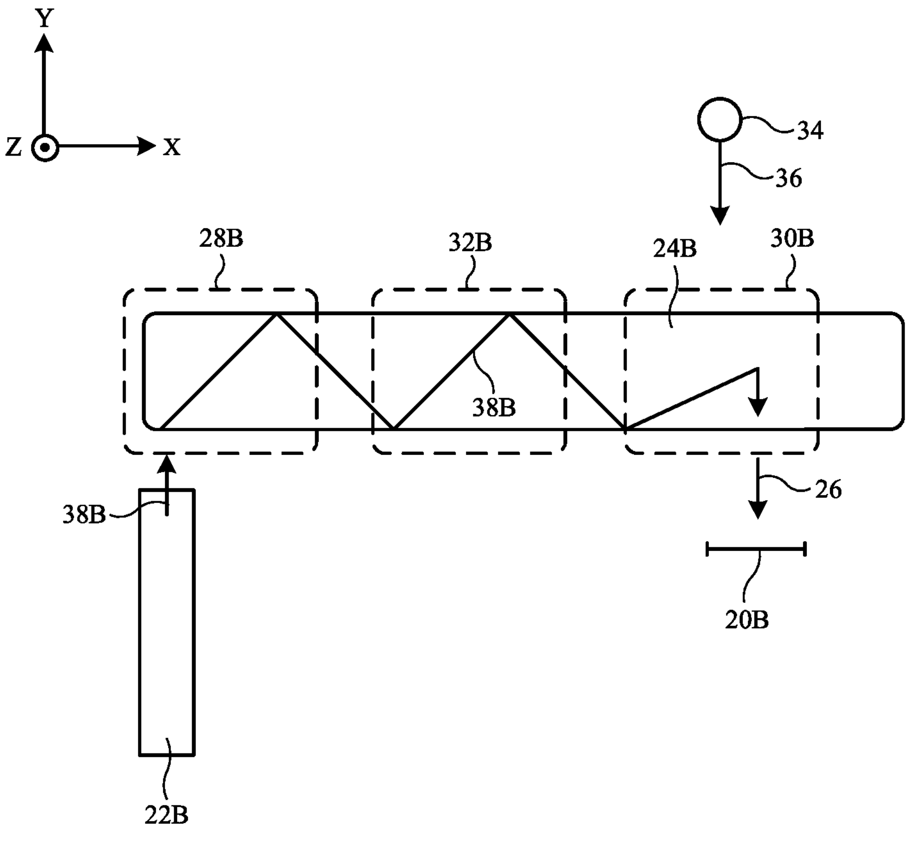
FIG. 3 is a top view of an illustrative display projector and waveguide for providing image light and world light to an eye box in accordance with some embodiments.

FIG. 3 is a top view showing how first waveguide 24B may provide light to first eye box 20B. As shown in FIG. 3, first projector 22B may emit image light 38B that is provided to first waveguide 24B. First projector 22B may include collimating optics (sometimes referred to as an eyepiece, eyepiece lens, or collimating lens) that help direct image light 38B towards first waveguide 24B. First projector 22B may generate image light 38B associated with image content to be displayed to (at) first eye box 20B. First projector 22B may include light sources that produce image light 38B (e.g., in scenarios where first projector 22B is an emissive display module, the light sources may include arrays of light emitters such as LEDs) or may include light sources that produce illumination light that is provided to a spatial light modulator first projector 22B. The spatial light modulator may modulate the illumination light with (using) image data (e.g., a series of image frames) to produce image light 38B (e.g., image light that includes images as identified by the image data). The spatial light modulator may be a transmissive spatial light modulator (e.g., may include a transmissive display panel such as a transmissive LCD panel) or a reflective spatial light modulator (e.g., may include a reflective display panel such as a digital micromirror device (DMD) display panel, a liquid crystal on silicon (LCOS) display panel, a ferroelectric liquid crystal on silicon (fL-COS) display panel, etc.).

First waveguide 24B may be used to present image light 38B output from first projector 22B to first eye box 24B. First waveguide 24B may include one or more optical couplers such as input coupler 28B, cross-coupler 32B, and output coupler 30B. In the example of FIG. 3, input coupler 28B, cross-coupler 32B, and output coupler 30B are formed at or on first waveguide 24B. Input coupler 28B, cross-coupler 32B, and/or output coupler 30B may be completely embedded within the substrate layers of first waveguide 24B, may be partially embedded within the substrate layers of first waveguide 24B, may be mounted to first waveguide 24B (e.g., mounted to an exterior surface of first waveguide 24B), etc.

The example of FIG. 3 is merely illustrative. One or more of these couplers (e.g., cross-coupler 32B) may be omitted. First waveguide 24B may be replaced with multiple waveguides that are laterally and/or vertically stacked with respect to each other. Each of these waveguides may include one, two, all, or none of couplers 28B, 32B, and 30B. First waveguide 24B may be at least partially curved or bent if desired.

First waveguide 24B may guide image light 38B down its length via total internal reflection. Input coupler 28B may be configured to couple image light 38B into first waveguide 24B, whereas output coupler 30B may be configured to couple image light 38B from within waveguide 24B to the exterior of first waveguide 24B and towards first eye box 24B. Input coupler 28B may include an input coupling prism or a diffractive gratings such as an SRG or a set of volume holograms, as examples. As shown in FIG. 3, first projector 22B may emit image light 38B in the +Y direction towards first waveguide 24B. When image light 38B strikes input coupler 28B, input coupler 28B may redirect image light 38B so that the light propagates within first waveguide 24B via total internal reflection towards output coupler 30B (e.g., in the +X direction). When image light 38B strikes output coupler 30B, output coupler 30B may redirect image light 38B out of first waveguide 24B towards first eye box 24B (e.g., back in the −Y direction). In scenarios where cross-coupler 32B is formed at first waveguide 24B, cross-coupler 24B may redirect image light 38B in one or more directions as it propagates down the length of first waveguide 24B, for example.

Input coupler 28B, cross-coupler 32B, and/or output coupler 30B may be based on reflective and refractive optics or may be based on holographic (e.g., diffractive) optics. In arrangements where couplers 28B, 30B, and 32B are formed from reflective and refractive optics, couplers 28B, 30B, and 32B may include one or more reflectors (e.g., an array of micromirrors, partial mirrors, louvered mirrors, or other reflectors). In arrangements where couplers 2B8, 30B, and 32B are based on holographic optics, couplers 28B, 30B, and 32B may include diffractive gratings (e.g., volume holograms, surface relief gratings, etc.). Any desired combination of holographic and reflective optics may be used to form couplers 28B, 30B, and 32B. In one suitable arrangement that is sometimes described herein as an example, input coupler 28B, cross-coupler 32B, and output coupler 30B each include surface relief gratings (e.g., surface relief gratings formed by modulating the thickness of one or more layers of surface relief grating substrate in first waveguide 24B).

In an augmented reality configuration, first waveguide 24B may also transmit (pass) real-world light from the scene/environment in front of (facing) device 10. The real-world light (sometimes referred to herein as world light, scene light, or environmental light) may include light emitted and/or reflected by objects in the scene/environment in front of device 10. For example, output coupler 30B may transmit world light 36 from real-world objects 34 in the scene/environment in front of device 10. Output coupler 30B may, for example, diffract image light 38B to couple image light 38B out of first waveguide 24B and towards first eye box 20B while transmitting world light 36 (e.g., without diffracting world light 36) to first eye box 20B. This may allow images in image light 38B to be overlaid with world light 36 of real-world objects 34 (e.g., to overlay virtual objects from image data in image light 38B as displayed by first projector 22B with real-world objects 34 in front of the user when viewed at first eye box 20A).

In the example of FIG. 3, only the waveguide and projector for providing image light to first eye box 20B is shown for the sake of clarity. Second waveguide 24A (FIG. 2) may include similar structures for providing light to second eye box 20A. During operation of device 10 (e.g., by an end user), mechanical stresses, thermal effects, and other stressors may alter the alignment between two or more components of device 10. For example, the optical alignment between the components of device 10 may change when the user places device 10 on their head, removes device 10 from their head, places device 10 on a surface or within a case, drops device 10 on the ground, when a mechanical impact event occurs at device 10, when device 10 enters different environments at different temperatures or humidities, when a user bends, stresses, or shakes one or more components in device 10, etc. If care is not taken, these changes in optical alignment can undesirably affect the images provided to eye boxes 20A and 20B (e.g., can produce visible misalignment at one or both eye boxes 20A and 20B). As these changes in optical alignment will vary by user and from system-to-system, it may be desirable to actively identify such changes in the field (e.g., during operation of device 10 by an end user rather than in-factory during the manufacture of device 10) so that suitable action can be taken to mitigate the identified changes to provide an optimal display experience for the user over time.

Figure 4:
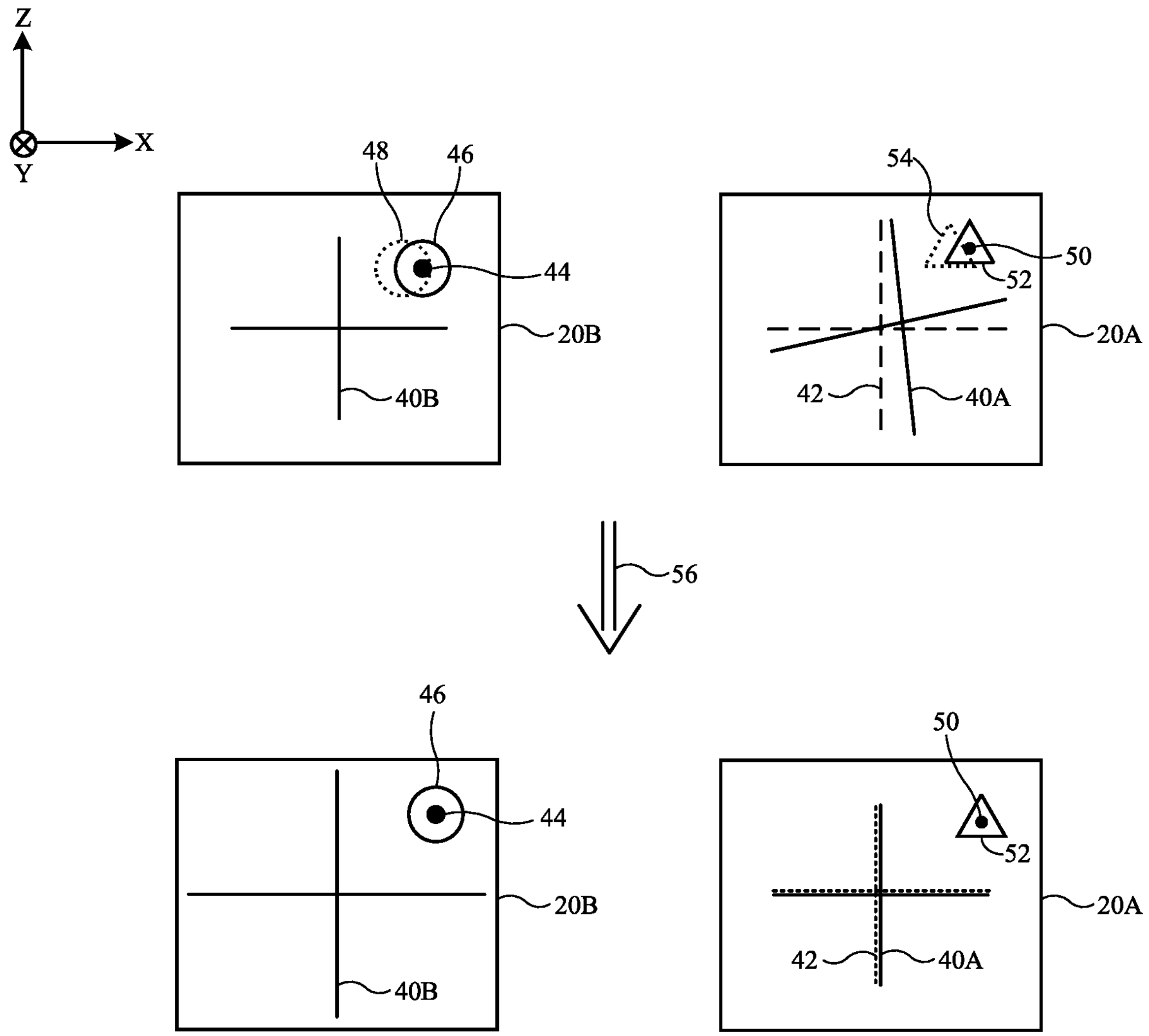
FIG. 4 is a diagram showing how an illustrative system may calibrate optical alignment in the image light provided to left and right eye boxes in accordance with some embodiments.

FIG. 4 is a diagram showing how device 10 may be calibrated to mitigate these changes in optical misalignment. As shown in FIG. 4, image data 40B (e.g., a left image) may be produced by first projector 22B and may be directed to first eye box 20B by first waveguide 24B. Image data 40A (e.g., a right image) may be produced by second projector 22A and may be directed to second eye box 20A by second waveguide 24A.

When first projector 22B and first waveguide 24B (e.g., the first display) are perfectly aligned with respect to second projector 22A and second waveguide 24A (the second display), image data 40A may be displayed at an ideal (nominal) location 42 within second eye box 20A (e.g., a location at which, when a user views eye boxes 20B and 20A with their respective left and right eyes, causes the image data to appear clearly and comfortably to the user given the user's binocular vision). In other words, nominal location 42 may be an expected location for image data 40A based on the binocular vision of the user.

However, when first projector 22B and/or first waveguide 24B become misaligned with respect to second projector 22A and/or second waveguide 24B, image data 40A may be received at second eye box 20A at a location other than nominal location 42, as shown in FIG. 4. This misalignment may present itself as a left-right binocular misalignment, causing virtual objects in image data 40A and/or 40B to appear blurry or misaligned between the eye boxes, or otherwise causing user discomfort when viewing both eye boxes 20A and 20B simultaneously. This left-right binocular misalignment may sometimes also be referred to herein as in-field drift (e.g., where virtual objects in one of the eye boxes drifts within the field of view from a nominal location due to misalignment between the left and right displays). In-field drift or other optical distortions may also be produced by misalignment or changes in alignment between first waveguide 24B and first projector 22B and misalignment between second waveguide 24A and second projector 22A.

If desired, the virtual objects in the image data provided to eye boxes 20A and 20B may be registered to one or more real-world objects 34 in world light 36 (FIG. 3). Real-world object registration involves the use of image sensors such as one or more outward-facing cameras (OFCs) on device 10. The OFCs may capture images of world light 36 to identify the presence of one or more real-world objects in the scene/environment in view of the system. One or more virtual objects in the image data provided to eye boxes 20A and 20B may be placed within the field of view at selected location(s) relative to one or more features or points on the one or more virtual objects detected using the OFCs.

For example, as shown in FIG. 4, a real-world object 44 may be present in the field of view of first eye box 20B and a real-world object 50 may be present in the field of view of second eye box 20A. The image data provided by image light 38B to first eye box 20B may include a virtual object 46 that is registered to real-world object 44 (e.g., such that the virtual object aligns with the real-world object within the field of view of first eye box 20B, overlaps with the real-world object within the field of view of first eye box 20B, is pinned to the real-world object within the field of view of first eye box 20B, tracks the real-world object within the field of view of first eye box 20B, etc.). Similarly, the image data provided by image light 38A to second eye box 20A may include a virtual object 52 that is registered to real-world object 50 (e.g., such that the virtual object aligns with the real-world object within the field of view of second eye box 20A, overlaps with the real-world object within the field of view of second eye box 20A, is pinned to the real-world object within the field of view of second eye box 20A, tracks the real-world object within the field of view of second eye box 20A, etc.). The image data provided to eye boxes 20B and 20A may include the same virtual object(s) provided at different locations between the eye boxes to accommodate binocular viewing of the virtual objects within the eye boxes, for example.

When one or more of the OFCs becomes misaligned with respect to one or more of first projector 22B, first waveguide 24B, second projector 22A, and/or second waveguide 24A (e.g., with respect to the first and/or second display), this may cause the virtual objects in the image data of one or both eye boxes to become misaligned with the real-world objects that the virtual objects are registered to. For example, virtual object 46 in first eye box 20B may become misaligned with respect to real-world object 44, such as at location 48, and/or virtual object 52 in second eye box 20A may become misaligned with respect to real-world object 50, such as at location 54.

Device 10 may perform in-field calibration operations using a set of sensors. In performing in-field calibration operations, the set of sensors may gather (e.g., measure, sense, or generate) sensor data that identifies the amount of optical misalignment in device 10. Control circuitry in device 10 may then perform adjustments to device 10 based on the identified amount of optical misalignment (e.g., to mitigate the identified amount of optical misalignment). The adjustments may include digital adjustments to the image data provided to projectors 22A and/or 22B for display at the eye boxes (e.g., to the image light 38A and/or 38B) such as digital translations, transformations, warping, distortion, or rotations to the image data and/or may include mechanical adjustments to projector 22A (or one or more components therein), projector 22B (or one or more components therein), second waveguide 24A, and/or first waveguide 24B (e.g., using actuators, microelectromechanical systems (MEMs) components, piezoelectric components, etc.). Performing in-field calibration operations in this way may allow device 10 to continue to exhibit proper optical alignment and thereby optimal display performance regardless of how the amount and type of optical misalignment present changes over time (e.g., due to mechanical stress effects and thermal effects on the system, how different users handle and operate the system, etc.).

The in-field calibration operations may serve to mitigate (e.g., calibrate, compensate for, or correct) optical misalignment that may be present in device 10, as shown by arrow 56. Such calibration may, for example, compensate for left-right binocular misalignment between the left and right displays (e.g., aligning image data 40A in second eye box 20A with nominal location 42) and/or may allow for proper registration of virtual objects with real-world objects (e.g., by properly registering virtual object 44 to real-world object 46, by properly registering virtual object 52 to real-world object 50, etc.).

Figure 5:
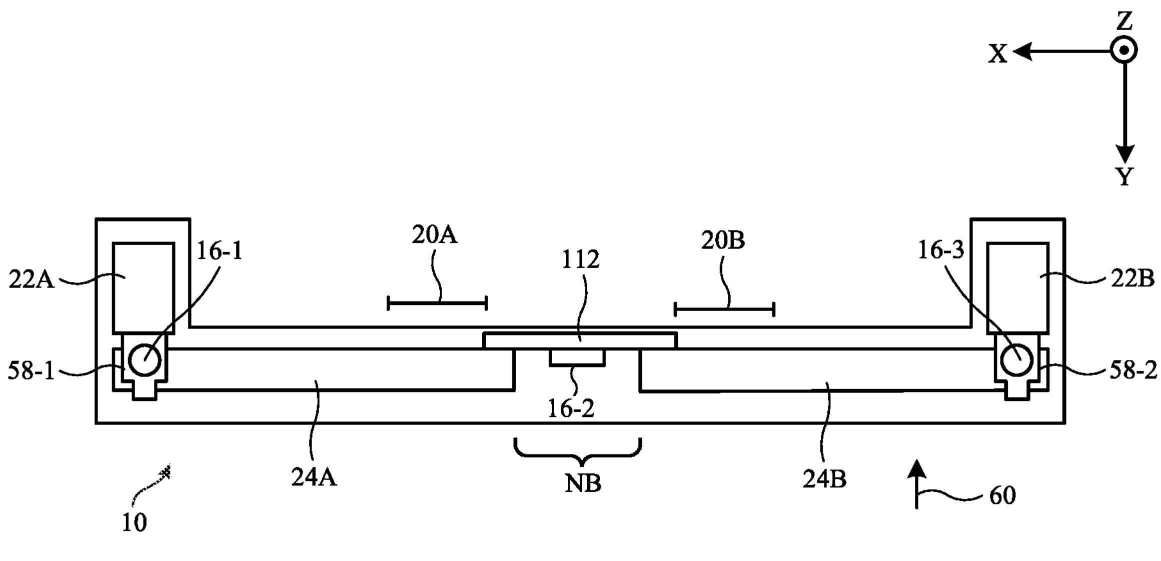
FIG. 5 is a top view of an illustrative head-mounted device having a left position sensor, a right position sensor, a bridge position sensor, and an optical bridge sensor for calibrating optical alignment in accordance with some embodiments.

The set of sensors used to perform in-field calibration operations in device 10 may include at least first, second, and third positional sensors and an optical bridge sensor. FIG. 5 is a cross-sectional top view of the main portion 18M of housing 18 (FIG. 2) showing how device 10 may include at least first, second, and third positional sensors and an optical bridge sensor.

As shown in FIG. 5, first projector 22B may be optically coupled to a first (left) edge of first waveguide 24B (e.g., a temple side/edge of the first waveguide). First waveguide 24B may propagate image light (e.g., image light 38B of FIG. 3) from first projector 22B towards its opposing second (right) edge (e.g., a nose bridge side/edge of the first waveguide). An output coupler (e.g., output coupler 30B of FIG. 5) may be located at or adjacent to the second edge of first waveguide 24B. The output coupler may couple the image light out of first waveguide 24B and may direct the image light towards first eye box 20B. If desired, one or more lens elements (not shown) may help to direct the image light coupled out of first waveguide 24B towards first eye box 20B.

Similarly, second projector 22A may be optically coupled to a first (right) edge of second waveguide 24A (e.g., a temple side/edge of the second waveguide). Second waveguide 24A may propagate image light from first projector 22A towards its opposing second (left) edge (e.g., a nose bridge side/edge of the second waveguide). An output coupler may be located at or adjacent to the second edge of second waveguide 24A. The output coupler may couple the image light out of second waveguide 24A and may direct the image light towards second eye box 20A. If desired, one or more lens elements (not shown) may help to direct the image light coupled out of second waveguide 24A towards second eye box 20A.

As shown in FIG. 5, an optical sensor such as optical bridge sensor 112 may be disposed within nose bridge NB of main portion 18M of the housing. Optical bridge sensor 112 may be coupled to the second edge of first waveguide 24B and may be coupled to the second edge of second waveguide 24A (e.g., optical bridge sensor 112 may bridge nose bridge NB). First waveguide 24B may include an additional output coupler at the second edge of first waveguide 24B. The additional output coupler may couple some of the image light propagating through first waveguide 24B out of first waveguide 24B and into optical bridge sensor 112. Similarly, second waveguide 24A may include an additional output coupler at the second edge of second waveguide 24A. The additional output coupler may couple some of the image light propagating through second waveguide 24A out of second waveguide 24A and into optical bridge sensor 112. Optical bridge sensor 112 may include one or more image sensors (e.g., cameras) that gathers image sensor data (sometimes referred to herein as optical bridge sensor image data) from the image light coupled out of waveguides 24A and 24B. The optical bridge sensor image data may be a real-time representation of the image data that is actually being provided to eye boxes 20A and 20B after propagating from the projectors 22 and through the waveguides 24. The optical bridge sensor image data may therefore allow for real-time measurement of any optical misalignment between the left and right displays in device 10.

Device 10 may also include at least two outward facing cameras 58 such as a first OFC 58-1 and a second OFC 58-2. OFCs 58-1 and 58-2 may capture images of world light 36 (FIG. 3). The captured images may be used to help to identify how device 10 is oriented relative to its environment and surroundings. The captured images may also be used to register real-world objects in the environment to virtual objects in the image data conveyed to eye boxes 20A and 20B (e.g., as shown in FIG. 4). OFCs 58-1 and 58-2 may be disposed at opposing sides of main portion 18M of the housing for device 10 to allow the captured images to be used for binocular vision and three-dimensional depth perception of the environment. For example, as shown in FIG. 5, OFC 58-1 may be disposed at the left side of device 10 and may overlap first projector 22B and/or the first edge of first waveguide 24B. Similarly, OFC 58-2 may be disposed at the right side of device 10 and may overlap second projector 22A and/or the first edge of second waveguide 24A. In other words, OFC 58-2, first projector 22B, and first waveguide 24B may be disposed in a first portion of housing 18, OFC 58-1, second projector 22A, and second waveguide 24A may be disposed in a second portion of housing 18, and nose bridge NB may couple the first portion of housing 18 to the second portion of housing 18.

As shown in FIG. 5, device 10 may include at least three position sensors 16 such as position sensors 16-1, 16-2, and 16-3. Position sensors 16-1, 16-2, and 16-3 may be IMUs, for example. Position sensor 16-3 may be disposed (mounted) at OFC 58-2 and may therefore sometimes be referred to herein as left position sensor 16-3. For example, position sensor 16-3 may be disposed on OFC 58-2 (e.g., on a frame, bracket, or housing of OFC 58-2), may be integrated within OFC 58-2 (e.g., within a frame, bracket, or housing of OFC 58-2), may be adhered or affixed to OFC 58-2 (e.g., using adhesive, screws, springs, pins, clips, solder, etc.), and/or may be disposed on a substrate (e.g., a rigid or flexible printed circuit board) that is layered onto or within OFC 58-2. In general, it may be desirable for position sensor 16-3 to be as tightly coupled to OFC 58-2 as possible so that position/orientation changes measured by position sensor 16-3 are accurate measurements of position/orientation changes of OFC 58-2.

Position sensor 16-1 may be disposed (mounted) at OFC 58-1 and may therefore sometimes be referred to herein as right position sensor 16-1. For example, position sensor 16-1 may be disposed on OFC 58-1 (e.g., on a frame, bracket, or housing of OFC 58-1), may be integrated within OFC 58-1 (e.g., within a frame, bracket, or housing of OFC 58-1), may be adhered or affixed to OFC 58-1 (e.g., using adhesive, screws, springs, pins, clips, solder, etc.), and/or may be disposed on a substrate (e.g., a rigid or flexible printed circuit board) that is layered onto or within OFC 58-1. In general, it may be desirable for position sensor 16-1 to be as tightly coupled to OFC 58-1 as possible so that position/orientation changes measured by position sensor 16-1 are accurate measurements of position/orientation changes of OFC 58-1.

Position sensor 16-2 may be disposed (mounted) at optical bridge sensor 112 and may therefore sometimes be referred to herein as central position sensor 16-2, bridge position sensor 16-2, or optical bridge sensor position sensor 16-2. For example, position sensor 16-2 may be disposed on optical bridge sensor 112 (e.g., on a frame, bracket, or housing of optical bridge sensor 112), may be integrated within optical bridge sensor 112 (e.g., within a frame, bracket, or housing of OFC 58-1), may be adhered or affixed to optical bridge sensor 112 (e.g., using adhesive, screws, springs, pins, clips, solder, etc.), and/or may be disposed on a substrate (e.g., a rigid or flexible printed circuit board) that is layered onto or within optical bridge sensor 112. In general, it may be desirable for position sensor 16-2 to be as tightly coupled to optical bridge sensor 112 as possible so that position/orientation changes measured by position sensor 16-2 are accurate measurements of position/orientation changes of optical bridge sensor 112.

The example of FIG. 5 is merely illustrative. Position sensors 16-1, 16-2, and 16-3 may be disposed at other locations. OFC 58-1 and OFC 58-2 may be disposed at other locations. Additional OFCs 58 may be disposed in main portion of the housing of device 10 or elsewhere on device 10. The additional OFCs may include respective position sensors 16 if desired. Device 10 may include more than three position sensors 16. If desired, one or more non-visible light image sources and image sensors (e.g., infrared emitters and infrared image sensors) may be disposed within device 10 (e.g., on, within, or adjacent to projector 22A, projector 22B, second waveguide 24A, and/or first waveguide 24B) for tracking the direction of a user's gaze within eye boxes 20A and 20B. The infrared light sources and/or infrared light emitters may include position sensors for measuring their position/orientation if desired (e.g., for performing optical alignment calibration for gaze tracking using the systems and methods described herein).

Figure 6:
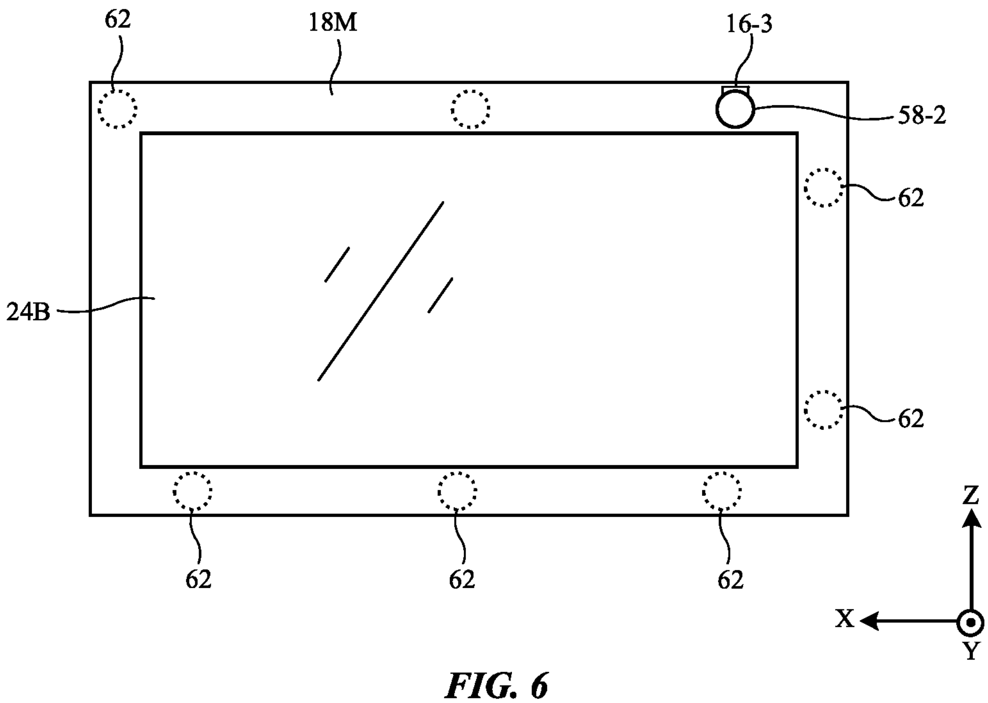
FIG. 6 is a front view showing how an illustrative position sensor and outward-facing camera may be mounted at different locations around the periphery of a waveguide in accordance with some embodiments.

FIG. 6 is a front view of first waveguide 24B (e.g., as viewed in the direction of arrow 60 of FIG. 5). As shown in FIG. 6, first waveguide 24B may be mounted within main portion 18M of the housing for device 10. First waveguide 24B may have a lateral surface in the X-Z plane of the page. The lateral surface of first waveguide 24B may have a periphery. In the example of FIG. 6, OFC 58-2 and its position sensor 16-3 are disposed at the top-right corner of the periphery of first waveguide 24B. This is merely illustrative and, in general, OFC 58-2 and position sensor 16-3 may be disposed at other locations around the periphery of first waveguide 24B, such as at any of locations 62. More than one OFC and position sensor may be disposed around the periphery of first waveguide 24B if desired.

Figure 7:
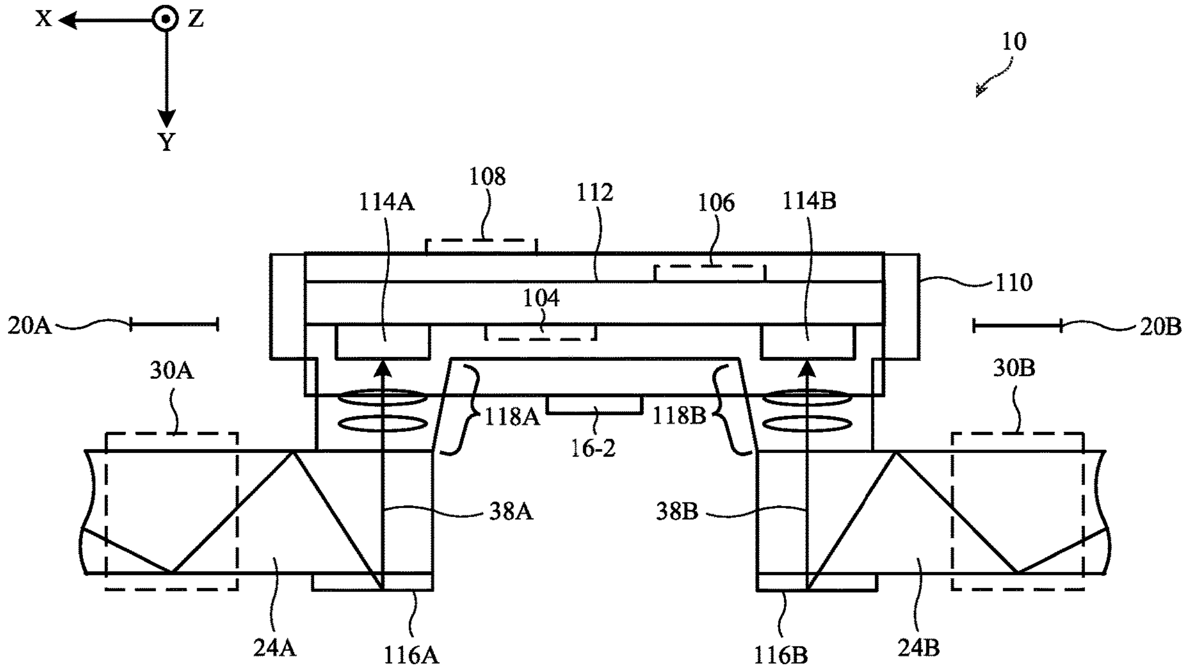
FIG. 7 is a cross-sectional top view of an illustrative optical bridge sensor in accordance with some embodiments.

FIG. 7 is a cross-sectional top view of optical bridge sensor 112 and its corresponding position sensor 16-2. Optical bridge sensor 112 may sometimes also be referred to as an optical misalignment detection sensor, an optical alignment sensor, or an optical misalignment detection module. As shown in FIG. 7, optical bridge sensor 112 may be integrated within a sensor housing 110. Sensor housing 110 may be formed from a part of main portion 18M of housing 18 within nose bridge NB (FIG. 1), may be a separate housing enclosed within nose bridge NB of main portion 18M, may be a frame or bracket that supports housing portion 18M, or may be omitted. Optical bridge sensor 112 (e.g., sensor housing 110) may have a first end mounted to first waveguide 24B and may have an opposing second end mounted to second waveguide 24A (e.g., using optically clear adhesive or other mounting structures).

First waveguide 24B may receive image light 38B from first projector 22B. Second waveguide 24A may receive image light 38A from second projector 22A. First waveguide 24B may have an output coupler 30B that couples a first portion of image light 38B out of the waveguide and towards first eye box 20A. Output coupler 30B may pass a second portion of image light 38B without coupling or diffracting the second portion of image light 38B out of first waveguide 24B. First waveguide 24B may include an additional output coupler 116B (e.g., a set of diffractive gratings such as a surface relief grating or volume holograms, louvered mirrors, an output coupling prism, etc.). Output coupler 116B may couple the second portion of image light 38B out of first waveguide 24B and into optical bridge sensor 112.

Similarly, second waveguide 24A may have an output coupler 30A that couples a first portion of image light 38A out of the waveguide and towards second eye box 20A. Output coupler 30A may pass a second portion of image light 38A without coupling or diffracting the second portion of image light 38A out of second waveguide 24A. Second waveguide 24A may include an additional output coupler 116A (e.g., a set of diffractive gratings such as a surface relief grating or volume holograms, louvered mirrors, an output coupling prism, etc.). Output coupler 116A may couple the second portion of image light 38A out of second waveguide 24A and into optical bridge sensor 112.

Optical bridge sensor 112 may have a first optical sensor 114A and a second optical sensor 114B (e.g., CMOS image sensors, quad cell image sensors, other types of image sensors or cameras, etc.). Optical sensors 114A an 114B may sometimes be referred to herein as image sensors 114A and 114B. If desired, optical bridge sensor 112 may include lens elements 118A that direct the second portion of the image light 38A from output coupler 116A towards image sensor 114A. If desired, optical bridge sensor 112 may also include lens elements 118B that direct the second portion of the image light 38B from output coupler 116B towards image sensor 114B. Image sensors 114A and 114B may gather image sensor data (optical sensor data such as optical bridge sensor image data) from image light 38A and 38B. Control circuitry in device 10 may process the optical bridge sensor image data for use in in-field optical alignment calibration operations. As one example, a specific pixel in projectors 22A/22B may be illuminated. The resultant image on image sensors 114A and 114B may then be used to compute relative misalignment between the left and right eye boxes. Relative clocking measurements may be made via multiple pixels.

Position sensor 16-2 may be mounted at any desired location on or in optical bridge sensor 112. For example position sensor 16-2 may be disposed on optical bridge sensor 112 within sensor housing 110 (e.g., at location 106 facing inwards or location 104 facing outwards) or may be disposed on sensor housing 110 (e.g., at a location facing outwards or at location 108 facing inwards). Position sensor 16-2 may be secured to optical bridge sensor 112 and/or sensor housing 110 using adhesive, screws, springs, pins, clips, solder, etc. If desired, position sensor 16-2 may be formed or mounted to a substate such as a rigid or flexible printed circuit that is layered onto optical bridge sensor 112 within sensor housing 110 or that is layered onto sensor housing 110.

In the example of FIG. 7, optical bridge sensor 112 includes two image sensors for capturing optical bridge sensor image data from the first and second waveguides respectively. This is merely illustrative. In another suitable arrangement, optical bridge sensor 112 may include a single image sensor for capturing optical bridge sensor image data from both the first and second waveguides.

Figure 8:
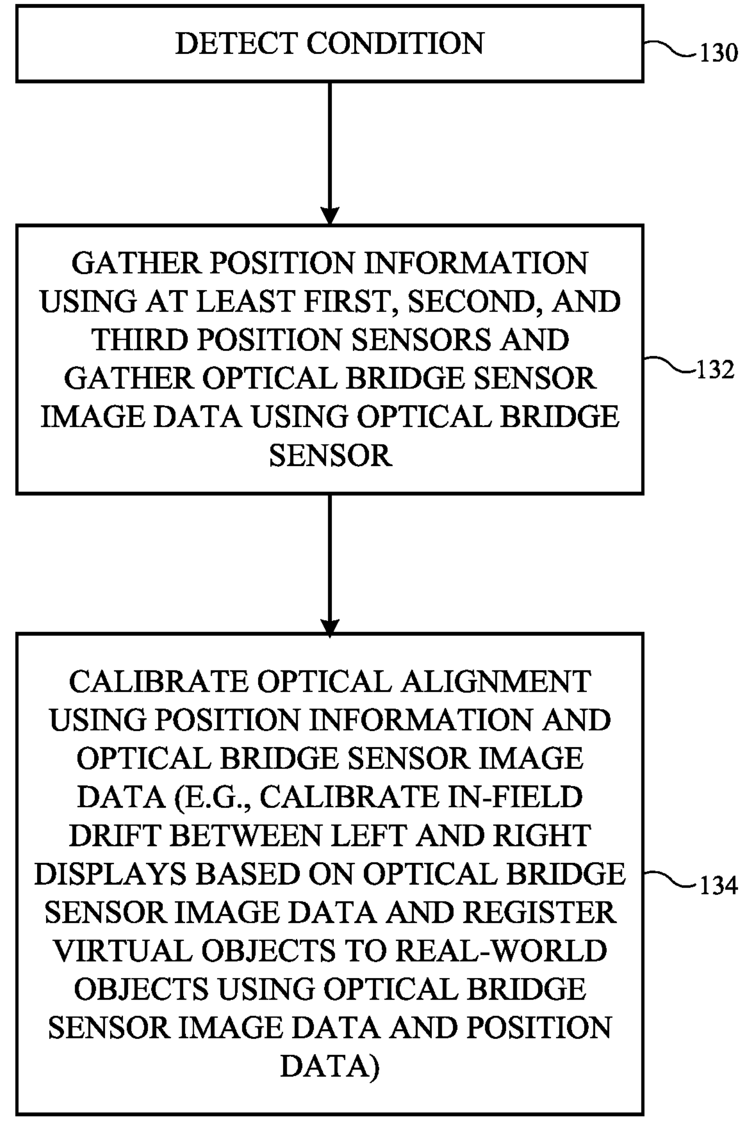
FIG. 8 is a flow chart of illustrative operations involved in using a system to calibrate optical alignment in accordance with some embodiments.

FIG. 8 is a flow chart of illustrative operations that may be performed by device 10 to perform in-field calibration using optical bridge sensor 112 and at least position sensors 16-1, 16-2, and 16-3. At operation 130, device 10 may monitor for conditions indicating that position information should be gathered using position sensors 16 and optical bridge sensor 112. In some scenarios, position sensors 16 and/or optical bridge sensor 112 may be used continuously (e.g., position measurements may be made repeatedly, periodically, etc.). In other situations, position sensors 16 and/or optical bridge sensor 112 may be inactive until predetermined trigger conditions are detected, at which point the sensors may be powered up and used to make measurements. This approach may help reduce power consumption by allowing position sensors 16 and/or optical bridge sensor 112 to be used only when position data is needed.

Device 10 may, as an example, use an input device such as a touch sensor, microphone, button, or other input device to gather user input from a user (e.g., a user input command indicating that position sensors 16 should gather position measurements and/or that optical bridge sensor 112 should gather optical bridge sensor data so that the optical alignment can be measured and corrected). As another example, an accelerometer, force sensor, or other sensor may be used to detect when devices 10 have been subjected to a drop event or other event that imparts stress to device components (e.g., excessive stress that might cause component misalignment). Devices 10 can also use internal clocks in their control circuitry to measure the current time (e.g., to determine whether a predetermined time for making position sensor measurements has been reached). If desired, operation 130 may be used to detect other conditions for triggering position sensor measurements and/or optical bridge sensor measurements (e.g., detecting when devices 10 have been placed within a storage case or have been removed from a storage case, detecting when device 10 is being powered on or powered off, detecting when wireless commands from another device 10 and/or remote equipment have been received, etc.). These criteria and/or other suitable position sensor measurement criteria may be used to determine when position measurements and/or optical bridge sensor image data should be gathered.

In response to detecting a condition indicating that position measurements and/or optical bridge sensor image data should be gathered, processing may proceed to operation 132. At operation 132, position sensors 16-1, 16-2, and 16-3 may gather position measurements (e.g., may gather position sensor data) and/or optical bridge sensor 112 may gather optical bridge sensor data from image light 38A and 38B. If desired, optical bridge sensor image data measurements may be made periodically (e.g., every X seconds, where X is less than 1 s, 0.5 s, at least 1 s, at least 10 s, at least 100 s, less than 500 s, less than 50s, less than 5 s, or other suitable time period). Additionally or alternatively, if desired, position measurements may be made periodically (e.g., every Y seconds, where Y is at least 1 s, at least 10 s, at least 100 s, or other periods longer than X). Additional position sensors may gather position measurements of one or more infrared emitters and/or one or more infrared image sensors for calibrating gaze tracking if desired.

At operation 134, device 10 may adjust (e.g., correct, calibrate, alter, etc.) optical alignment between first projector 22B, second projector 22A, first waveguide 24B, and/or second waveguide 24A based on the position measurements and/or the optical bridge sensor image data. The adjustments may include adjustments to the image data displayed at first eye box 20B using the image light 38B produced by first projector 22B and/or adjustments to the image data displayed at second eye box 20A using the image light 38A produced by second projector 22A (e.g., image warping, geometric transforms, image distortion, image translations, etc.) and/or may include mechanical adjustments to one or more of first projector 22B, second projector 22A, first waveguide 24B, and/or second waveguide 24A. For example, in response to determining that binocular misalignment and/or real-world object registration is misoriented with respect to one or both of the displays leading to undesired image warping, the control circuitry of a device may be used to apply a geometric transform to the images being output by the display. The geometric transform may create an equal and opposite amount of image warping, so that the images viewed in the eye boxes are free from misalignment-induced distortion.

As an example, device 10 may calibrate (e.g., correct, compensate, mitigate, etc.) in-field drift between the left and right displays based on the optical bridge sensor image data (e.g., since the optical bridge sensor data is a real-time measure of the image light provided to the eye box by the left and right projectors and is thereby indicative of binocular misalignment). Device 10 may additionally or alternatively register virtual objects in the image data to real-world objects captured using at least OFCs 58-1 and 58-2 based on the optical bridge sensor data and the position measurements gathered using position sensors 16-1, 16-2, and 16-3. Position sensors 16-1, 16-2, and 16-3 may, for example, be used to identify the relative orientation between OFC 58-1 and optical bridge sensor 112, the relative orientation between OFC 58-2 and optical bridge sensor 112, and the relative orientation between OFCs 58-1 and 58-2. As the optical bridge sensor image data measures where virtual objects are presented at the eye boxes relative to their nominal positions, these relative orientations may be used to determine any misalignment between virtual objects themselves and the corresponding real-world objects that the virtual objects are registered to (e.g., since OFCs 58-1 and 58-2 capture the real-world objects and create knowledge in device 10 of the location of the real-world objects within the field of view).

If desired, additional optical alignment calibrations may be performed using the optical bridge sensor data, the position measurements, and/or any other desired sensor data (e.g., using the calibration of left-right binocular alignment (in-field drift) and real-world object registration (relative orientation between OFC 58-1, OFC 58-2, and optical bridge sensor 112) as a baseline calibration). If desired, position measurements of one or more infrared emitters and/or one or more infrared image sensors may be used to adjust and calibrate optical alignment used in gaze tracking operations.

During operation of device 10 by an end user (e.g., in the field), forces may be applied to optical bridge sensor 112 (FIG. 7) that undesirably affect measurements and calibrations performed using optical bridge sensor 112. For example, some portions of sensor housing 110 may bend with respect to other portions of sensor housing 110. These bending forces can be particularly pronounced because the optical bridge sensor is located in nose bridge NB of main portion 18M of the housing for the device, which can be subject to strain whenever the user places device 10 on their head. Such bending may, for example, misalign first image sensor 114A with respect to second image sensor 114 over time (e.g., one of the image sensors may degrade during operation by an end user adding additional error to the system). To mitigate these issues, optical bridge sensor 112 may be provided with a single image sensor that receives both image light 38A and image light 38B via dedicated bridge sensor optics that are in a first reference frame that is different from the reference frame of waveguides 24A and 24B.

Figure 9:
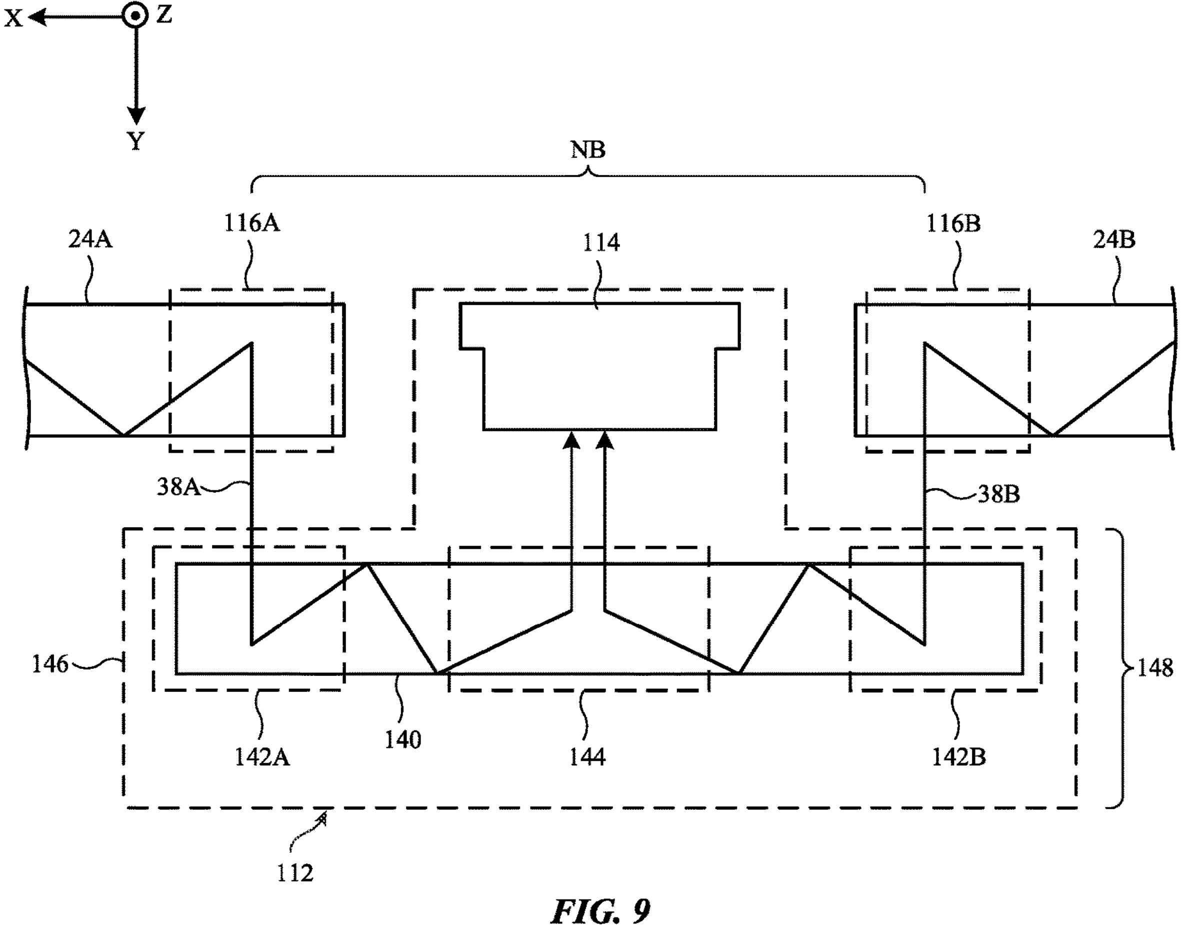
FIG. 9 is a cross-sectional top view of an optical bridge sensor having a single image sensor and a dedicated waveguide for directing image light to the single optical sensor in accordance with some embodiments.

FIG. 9 is a cross-sectional top view showing one example of how optical bridge sensor 112 may include a single image sensor that receives both image light 38A and image light 38B via optical bridge sensor optics. As shown in FIG. 9, optical bridge sensor 112 may include a single optical sensor 114 (e.g., a single image sensor or array of image sensor pixels). Optical bridge sensor 112 may also include bridge sensor optics 148. Optical sensor 114 may, for example, be disposed (interposed) between waveguides 24A and 24B. Bridge sensor optics 148 may be disposed at or facing a world-side of waveguides 24A and 24B, for example. Optical bridge sensor 112 of FIG. 9 may, for example, occupy less volume in device 10 than in the arrangement of FIG. 7.

Output coupler 116A on waveguide 24A may couple image light 38A out of waveguide 24A and towards bridge sensor optics 148. Output coupler 116B on waveguide 24B may couple image light 38B out of waveguide 24B and towards bridge sensor optics 148. Bridge sensor optics 148 may direct image light 38A and image light 38B towards optical sensor 114 (e.g., within a single field of view or two respective fields of view on the imaging surface of optical sensor 114). Optical sensor 114 may gather optical bridge sensor data in response to image light 38A and 38B.

Optical sensor 114 and bridge sensor optics 148 may be disposed within nose bridge NB of the housing 18 of device 10. Waveguides 24A and 24B may be mounted to housing 18 within a first reference frame. Optical sensor 114 and bridge sensor optics 148 may be mounted to housing 18 (e.g., using a mounting bracket, frame, or other structures) within a second reference frame 146. Any forces or bending applied to reference frame 146 will therefore produce uniform effects in the image light from the left waveguide and the image light from the right waveguide as imaged by optical sensor 114. Similarly, any bending or rotation of optical sensor 114 with respect to bridge sensor optics 148 will produce uniform effects in the image light from the left waveguide and the image light from the right waveguide as imaged by optical sensor 114. In other words, any bending or forces applied to nose bridge NB of the housing may produce uniform error for the image light received by the optical bridge sensor from both the left and right waveguides (e.g., without introducing variation between the left image light and the right image light that can be difficult or impossible to calibrate out). However, the uniform error may be easily calibrated out of the optical bridge sensor data (e.g., for use in performing the operations of FIG. 8).

Bridge sensor optics 148 may include any desired optical components such as one or more lenses, prisms, optical wedges, beam splitters, polarizers, polarizing beam splitters, waveplates, waveguides, optical couplers, diffractive gratings (e.g., one or more volume holograms or surface relief gratings), mirrors, reflectors, masking layers, etc. for redirecting image light 38A and 38B towards optical sensor 114. One or more position sensors 16 (FIG. 7) may be mounted to optical sensor 114 and/or optical bridge sensor optics 148.

In the example of FIG. 9, bridge sensor optics 148 include a dedicated optical bridge sensor waveguide such as waveguide 140. Waveguide 140 may at least partially overlap optical sensor 114, waveguide 24A, and/or waveguide 24B. For example, waveguide 140 may have a first end that overlaps waveguide 24A and an opposing second end that overlaps waveguide 24B. Waveguide 140 may be spaced apart (separated) from waveguides 24A and 24B or may be mounted to waveguides 24A and 24B. Waveguide 140 may be spaced apart (separated) from optical sensor 114 or may be mounted to optical sensor 114.

Waveguide 140 may include one or more input couplers 142 such as a first input coupler 142A and a second input coupler 142B. Waveguide 140 may also include one or more output couplers such as output coupler 144. Input coupler 142A may be disposed (mounted) at, on, within, and/or overlapping the first end of waveguide 24A (e.g., input coupler 142A may overlap waveguide 24A). Input coupler 142B may be disposed (mounted) at, on, within, and/or overlapping the second end of waveguide 24B (e.g., input coupler 142B may overlap waveguide 24B). Output coupler 144 may be disposed (mounted) at, on, within, and/or overlapping optical sensor 114. Output coupler 114 may therefore be (laterally) disposed (interposed) on waveguide 144 between input coupler 142A and input coupler 142B.

Output coupler 116A on waveguide 24A may direct image light 38A towards input coupler 142A on waveguide 140. Input coupler 142A may couple image light 38A into waveguide 32 (e.g., at an output angle within the total internal reflection (TIR) range of waveguide 140) and may direct image light 38A towards output coupler 144. Image light 38A may propagate along waveguide 140 towards output coupler 144 via TIR.

Output coupler 116B on waveguide 24B may direct image light 38B towards input coupler 142B on waveguide 140. Input coupler 142B may couple image light 38B into waveguide 32 (e.g., at an output angle within the total internal reflection (TIR) range of waveguide 140) and may direct image light 38B towards output coupler 144 (e.g., in propagation direction opposite the direction with which input coupler 142A directs image light 38A). Image light 38B may propagate along waveguide 140 towards output coupler 144 via TIR (e.g., in a direction opposite to the direction with which image light 38A propagates along waveguide 140 via TIR).

Output coupler 144 may receive image light 38A (e.g., at a first incident angle within the TIR range of waveguide 140) and may receive image light 38B (e.g., at a second incident angle within the TIR range of waveguide 140). Output coupler 144 may couple image light 38A out of waveguide 140 and may direct image light 38A towards optical sensor 114. Output coupler 144 may couple image light 38B out of waveguide 140 and may direct image light 38B towards optical sensor 114. Output coupler 144 may direct image light 38A and image light 38B onto the same field of view on optical sensor 114 (e.g., image light 38A and image light 38B may be superimposed/overlapping in the same field of view at optical sensor 114 to illuminate the same pixels of optical sensor 114). Alternatively, output coupler 144 may direct image light 38A and image light 38B onto different respective fields of view on optical sensor 114 (e.g., image light 38A and image light 38B may illuminate different pixels of optical sensor 114).

Input coupler 142A may include an input coupling prism (e.g., a reflective or transmissive input coupling prism), an angled edge or facet of waveguide 140, one or more partial reflectors or mirrors (e.g., a louvered mirror), a set of diffractive gratings (e.g., a set of volume holograms, a surface relief grating, etc.), or any other desired input coupling optics. Input coupler 142B may include an input coupling prism (e.g., a reflective or transmissive input coupling prism), an angled edge or facet of waveguide 140, one or more partial reflectors or mirrors (e.g., a louvered mirror), a set of diffractive gratings (e.g., a set of volume holograms, a surface relief grating, etc.), or any other desired input coupling optics. Output coupler 144 may include one or more output coupling prisms (e.g., a single output coupling prism that couples both image light 38A and 38B out of waveguide 140 or two output coupling prisms that couple image light 38A and 38B respectively out of waveguide 140), one or more angled edges or facets of waveguide 140, one or more partial reflectors or mirrors (e.g., one or more louvered mirrors, a first mirror that reflects image light 38A and a second mirror that reflects image light 38B, etc.), one or more sets of diffractive gratings, or any other desired output coupling optics.

In implementations where output coupler 144 includes diffractive gratings, output coupler 144 may, for example, include a first set of volume holograms that diffracts image light 38A towards optical sensor 114 and a second set of volume holograms that diffracts image light 38B towards optical sensor 114. The first and second sets of volume holograms may, if desired, be at least partially overlapping on waveguide 140. The first and second sets of volume holograms may, for example, be superimposed within the same volume of a grating medium on waveguide 140. In other examples, output coupler 144 may include a first SRG that diffracts image light 38A and a second SRG that diffracts image light 38B.

Waveguide 140 may include one or more waveguide substrates layered on the grating medium (e.g., where the grating medium is sandwiched between waveguide substrates). If desired, diffractive gratings in input coupler 142A, input coupler 142B, and/or output coupler 144 may all be disposed, embedded, etched, or recorded in the same layer of grating medium on waveguide 140. Alternatively, diffractive gratings in input coupler 142A, input coupler 142B, and/or output coupler 144 may be disposed, embedded, or recorded in different respective layers of grating media on waveguide 140.

In performing calibration operations using optical bridge sensor 112, projectors 22 (FIG. 2) may transmit a sequence (series) of one or more predetermined calibration patterns of image data in image light 38 (e.g., while processing operations 132-134 of FIG. 8). These calibration patterns may be used specifically for the purpose of calibrating optical alignment (e.g., without including other virtual objects intended for the user's view). Optical bridge sensor 112 may capture images of the calibration patterns as frames of optical bridge sensor image data (sometimes referred to herein simply as sensor data). Optical bridge sensor 112 (e.g., one or more processors) may compare the captured images of the calibration patterns to predetermined (reference) images of the calibration patterns (e.g., under predetermined ideal optical alignment conditions) and/or may compare the captured images of the calibration patterns transmitted by projectors 22A and 22B to identify and correct for optical misalignments in the system.

If care is not taken, the calibration pattern can undesirably obscure the user's view of real-world objects in world light transmitted to eye box 20 through the waveguide and/or can undesirably distract the user from other virtual objects in image light 38 that are intended for the user to see (e.g., virtual objects associated with an application running on the device). It may therefore be desirable to be able to hide or obfuscate the calibration pattern within image light 38 such that the calibration pattern is unnoticeable or invisible to the user when the user's eyes are at eye boxes 20A and 20B.

Figure 10:
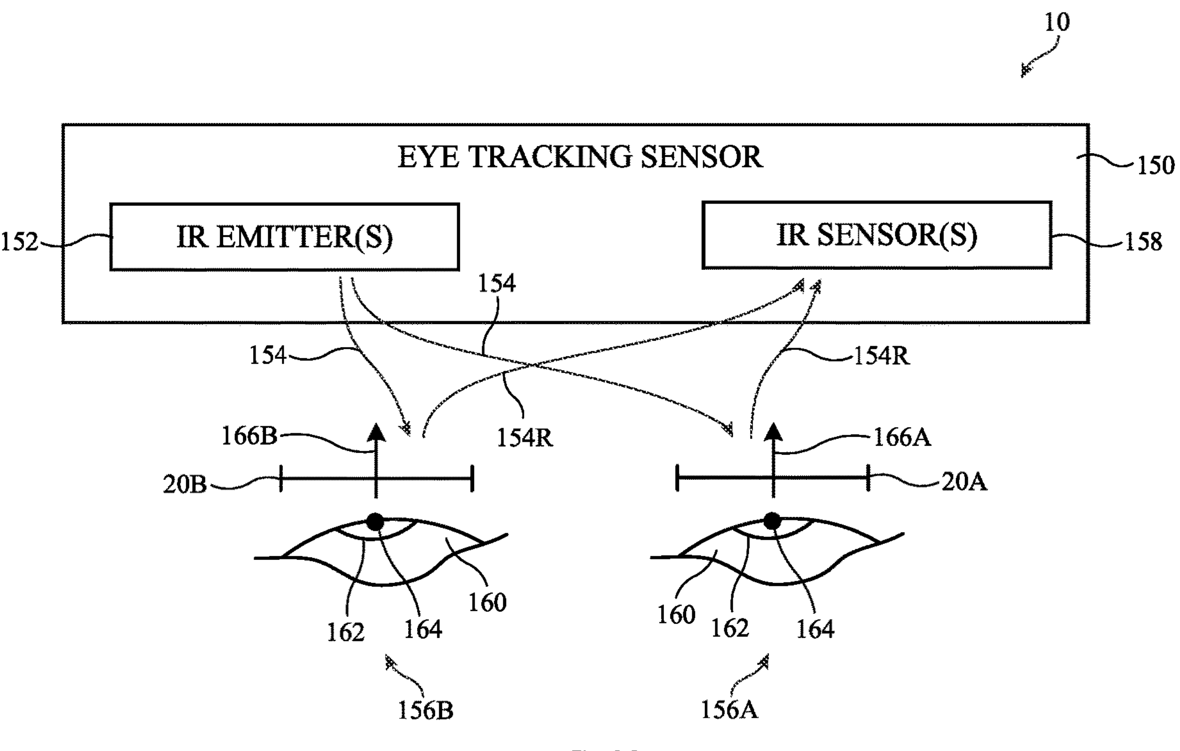
FIG. 10 is a diagram of an illustrative gaze tracking sensor in accordance with some embodiments.

Device 10 may implement one or more gaze-based hiding/obfuscation techniques to help hide the calibration pattern from view based on sensor data captured by a gaze tracking sensor on device 10. FIG. 10 is a diagram showing how device 10 may include a gaze tracking sensor.

As shown in FIG. 10, device 10 may include an optical sensor such as eye tracking sensor 150. Eye tracking sensor 150 may sometimes also be referred to herein as gaze tracking sensor 150, gaze monitoring sensor 150, eye monitoring sensor 150, gaze sensor 150, or eye sensor 150. Eye tracking sensor 150 may include one or more optical emitters such as infrared (IR) emitter(s) 152 and one or more optical receivers (sensors) such as IR sensor(s) 158 (sometimes referred to herein as optical sensor(s) 158).

IR emitter(s) 8 may include one or more light sources that emit sensing light such as light 154. Light 154 may be used for performing optical sensing on/at one or both of eye boxes 20A and 20B (e.g., gaze tracking) rather than conveying pixels of image data such as in image light 38. Light 154 may include infrared light and may therefore sometimes be referred to herein as IR light 154. The infrared light may be at infrared (IR) wavelengths and/or near-infrared (NIR) wavelengths (e.g., any desired wavelengths from around 700 nm to around 1 mm). IR light 154 may additionally or alternatively include wavelengths less than 700 nm if desired. IR light 154 may sometimes be referred to herein as sensor light 154.

IR emitter(s) 152 may direct IR light 154 towards eye boxes 20A and 20B. IR light 154 may be transmitted directly to eye boxes 20A and 20B or may, if desired, be propagated towards eye boxes 20A and 20B by one or more optical components in device 10 (e.g., waveguides 24A and 24B, additional dedicated gaze tracking waveguides, lenses, diffractive gratings, etc.). A user's eyes 156 may be located within eye boxes 20A and 20B when using device 10 (e.g., the user's left eye 156B may overlap eye box 20B whereas the user's right eye 156A may overlap eye box 20A).

IR light 154 may reflect off of one or more portions of eyes 156 as reflected IR light 154R (e.g., glints of reflected IR light). For example, IR light 154 may reflect off portions of the user's retina, the user's corneas 160, the inner (posterior) surface of the eye lens (e.g., as Purkinje images), etc. IR sensor(s) 158 may receive reflected IR light 154R (e.g., directly or through one or more optical components in device 10). IR sensor(s) 158 may receive reflected light 154R from optical system 22 and may gather (e.g., generate, measure, sense, produce, etc.) optical sensor data in response to the received reflected light 154R. IR sensor(s) 158 may include one or more image sensors or cameras (e.g., infrared image sensors or cameras). IR sensor(s) 158 may include, for example, one or more image sensor pixels (e.g., arrays of image sensor pixels). The optical sensor data may include image sensor data (e.g., image data, infrared image data, one or more images, etc.). The image sensor data may include images of the portions of eyes 156 off of which IR light 154 has reflected.

IR sensor(s) 158 may pass the optical sensor data to control circuitry for further processing. The control circuitry (e.g., one or more processors) may identify the orientation and/or position of eyes 156 based on the sensor data generated by IR sensor(s) 158. For example, the control circuitry may identify (detect) information about the appearance of eyes 156 such as pupil information, gaze direction information, iris information, blood vessel information, and/or other physiological information (sometimes referred to collectively herein as gaze information or eye information) based on the sensor data. If desired, the control circuitry may construct a digital model based on the sensor data and may then deduce the orientation of the eye globe (e.g., gaze direction) based on the model. If desired, the control circuitry may determine the location of a center 164 of the pupil 162 of eyes 156 and/or the direction in which the user is currently looking (e.g., the gaze direction of left eye 156B, as characterized by left gaze vector 166B, and/or the gaze direction of right eye 156A, as characterized by right gaze vector 166A) based on the sensor data. If desired, projectors 22 may update the image light 38 displayed by the projectors based on the identified gaze direction (e.g., may update the image data provided to projectors 22 based on gaze vectors 166 to shift the location of virtual images based on where the user's gaze is directed, etc.).

If desired, the control circuitry may identify when a user is blinking, beginning to blink, or is about to blink based on the sensor data (e.g., by comparing the sensor data to predetermined sensor data associated with the user blinking, beginning a blink, or a physiology when the user is about to blink). The control circuitry may also identify a duration of the blink or a typical duration with which the user blinks. If desired, the control circuitry may also identify the occurrence, beginning, or future occurrence of saccades of eyes 156 based on the sensor data (e.g., by comparing the sensor data to predetermined sensor data associated with the user's eyes performing a saccade, beginning a saccade, or a physiology associated with the eyes beginning a saccade in the future). Saccades are physiological occurrences where eyes 156 rapidly change orientation (e.g., jump) from a first orientation to a second orientation rather than smoothly and gradually changing angle from the first orientation to the second orientation. The control circuitry may also identify a duration of the saccade or a typical duration with which the user's eyes perform saccades.

Figure 11:
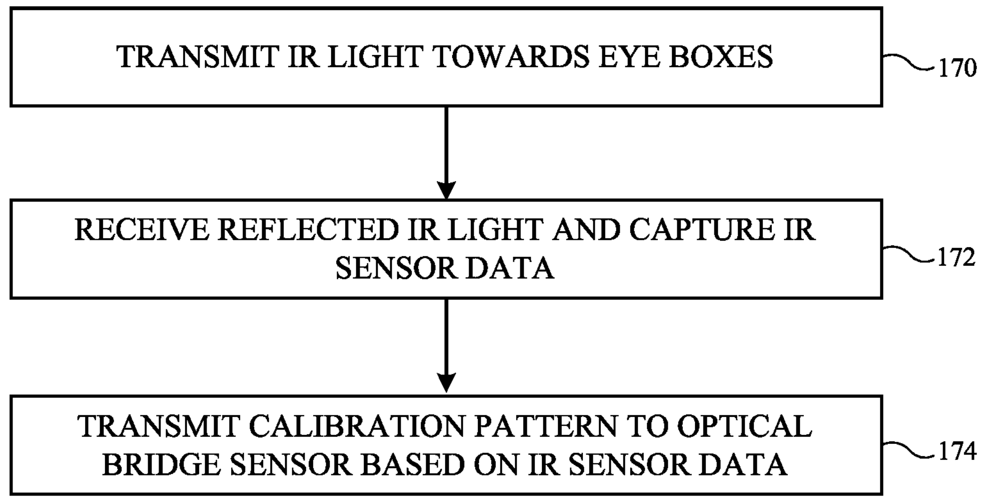
FIG. 11 is a flow chart of illustrative operations involved in transmitting a calibration pattern to an optical bridge sensor based on sensor data gathered by a gaze tracking sensor in accordance with some embodiments.

Projectors 22 may display calibration patterns in the image light provided to optical bridge sensor 112 based on the sensor data gathered by IR sensor(s) 158 in a manner that helps to hide or obfuscate the calibration patterns from being visible or perceivable to the user when eyes 156 are overlapping eye boxes 20A and 20B. FIG. 11 is a flow chart of illustrative operations that may be performed by device 10 to transmit calibration patterns based on sensor data gathered by eye tracking sensor 150. One or more of the operations of FIG. 11 may be performed concurrently with the display of image data in image light 38 and/or concurrently with one or more of operations 130 and 132 of FIG. 8.

At operation 170, IR emitter(s) 152 in eye tracking sensor 150 may transmit IR light 154 to eye box 20A and/or eye box 20B. IR light 154 may reflect off of different portions of eyes 156 at eye boxes 20A and/or 20B as reflected IR light 154R.

At operation 172, IR sensor(s) 158 may receive reflected IR light 154R. IR sensor(s) 158 may gather (generate) sensor data in response to reflected IR light 154R (e.g., may capture infrared images of different portions of eyes 156 as carried by reflected IR light 154R).

At operation 174, projector 22A and/or projector 22B may transmit a calibration pattern in image light 38 based on the sensor data generated at operation 172. The projector(s) may transmit the calibration pattern(s) at locations within the field of view (FOV) of image light 38 that are selected based on the sensor data and/or at times that are selected based on the sensor data gathered by eye tracking sensor 150.

While described herein in connection with a single projector 22 that emits corresponding image light 38 (e.g., image light 38A emitted by projector 22A or image light 38B emitted by projector 22B), the gaze-based calibration pattern obfuscation techniques described herein may be performed by one or both of projectors 22A and 22B for calibration patterns emitted in image light 38A and/or 38B, respectively.

Figure 12:
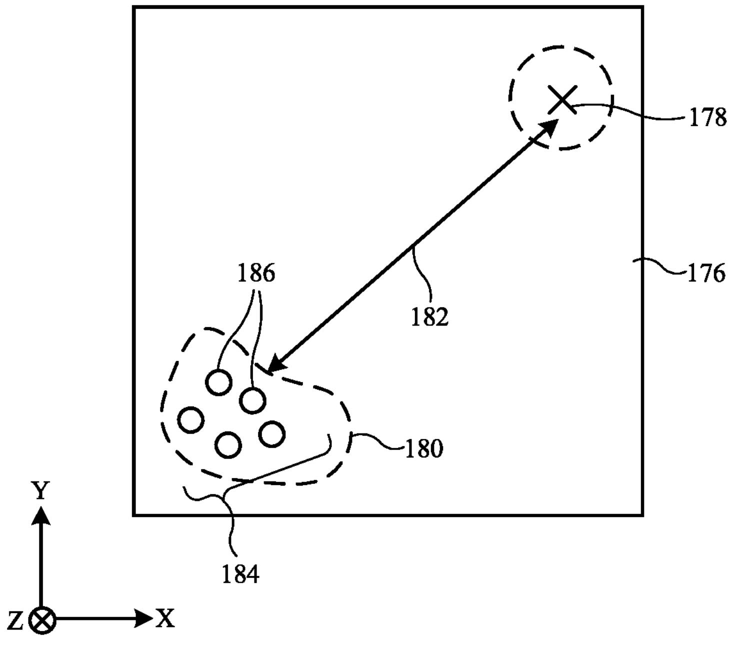
FIG. 12 is a diagram showing how an illustrative calibration pattern may be hidden within a region of a field of view that is different from a user's gaze direction in accordance with some embodiments.

As one example, projector 22 may transmit a calibration pattern in image light 38 (for receipt by optical bridge sensor 22) within a region of the FOV of image light 38 that is different from the user's current gaze direction as detected by eye tracking sensor 150. FIG. 12 is a front view (e.g., as viewed by a user at a corresponding eye box 20) showing how projector 22 may hide the calibration pattern within a region of the FOV of image light 38 that is different from the user's current gaze direction.

As shown in FIG. 12, image light 38 may have a FOV 176 as the image light propagates through the system. Projector 22 may include a calibration pattern 184 in image light 38 that is displayed for one or more frames (e.g., in one or more frames of the image light 38 generated by projector 22). Calibration pattern 184 may include one or more calibration dots 186. Calibration pattern 184 may sometimes be referred to herein as calibration frame 184 or dot pattern 184. Calibration dots 186 may sometimes also be referred to herein as calibration objects 186, calibration markers 186, or simply as dots 186.

Each calibration dot 186 may span or contain one or more pixels (e.g., adjacent, continuous, and/or non-contiguous pixels) in image light 38. Calibration dots 186 are shown as circular dots in FIG. 12. This is merely illustrative. In general, calibration dots 186 may have any desired shapes (e.g., may be elliptical, rectangular, square, hexagonal, circular, triangular, X-shaped, linear, or any other desired shape having any desired number of curved and/or straight edges). Calibration dots 186 may be arranged in a grid pattern (e.g., a rectangular grid of rows and columns, a hexagonal grid, etc.), a circular pattern, an elliptical pattern, a random pattern, or any other desired pattern. In general, each calibration dot 186 may be placed at any desired location within field of view (FOV) 176. Calibration pattern 184 may include any desired number of one or more calibration dots 186 (e.g., two calibration dots 186, four calibration dots 186, eight calibration dots 186, dozens of calibration dots 186, hundreds of calibration dots 186, thousands of calibration dots 186, etc.). If desired, two or more calibration dots 186 may be touching or continuous with each other.

Eye tracking sensor 150 may gather sensor data and may identify a direction of the user's gaze at eye box 20 based on the gathered sensor data. For example, as shown in FIG. 12, control circuitry may identify, from the sensor data, that the user's eye has a gaze (e.g., gaze vector) oriented towards location 178 in FOV 176. Projector 22 may place calibration pattern 184 within a region 180 of FOV 176 that is located away from location 178 (the detected gaze direction). Region 180 may, for example, be non-overlapping with respect to location 178. If desired, region 180 may be separated from location 178 by at least distance 182 (e.g., a minimum angular separation) across FOV 176. Distance 182 may span 10%, 20%, 30%, 40%, 50%, 60%, 70%, 80%, more than 80%, more than 50%, more than 20% or other percentages of the width of FOV 176, for example. By separating calibration pattern 180 from the direction of the user's gaze, the user will be less likely to notice the presence of calibration pattern 184 and thus calibration pattern 184 may be obfuscated for the user.

Optical bridge sensor 112 may generate sensor data (images) in response to the calibration pattern 184 in the image light 38 as received at the optical bridge sensor. One or more processors in device 10 may compare the shape and/or position of one or more of the calibration dots 186 in the calibration pattern 184 produced by one of projectors 22 to the shape and/or position of one or more of the calibration dots 186 emitted in a corresponding calibration pattern 184 produced by the other projector 22 (e.g., between left and right sides of the device) and/or to one or more of the calibration dots 186 emitted by one or both projectors in the corresponding calibration pattern 184 at one or more previous times (e.g., at a reference time prior to occurrence of the trigger condition detected at operation 130 of FIG. 8) to detect optical alignment or misalignment between two or more optical components of device 10. The one or more processors may correct for any detected misalignment while processing operation 134 of FIG. 8.

Figure 13:
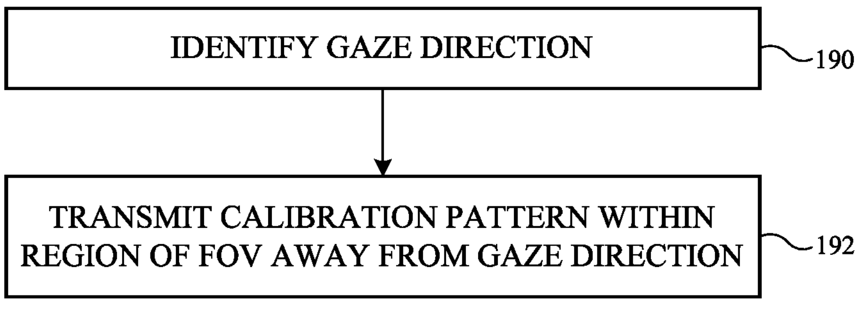
FIG. 13 is a flow chart of illustrative operations involved in transmitting a calibration pattern within a region of a field of view that is different from a user's gaze direction in accordance with some embodiments.

FIG. 13 is a flow chart of illustrative operations that may be performed by device 10 to transmit calibration pattern 184 within a portion of FOV 176 that is away from the direction of the user's gaze as identified using eye tracking sensor 150. The operations of FIG. 13 may be performed while processing operation 174 of FIG. 11, for example.

At operation 190, the control circuitry on device 10 may identify the gaze direction of the user's eye overlapping eye box 20 based on the sensor data gathered by eye tracking sensor 150. For example, the control circuitry may identify the orientation of gaze vector 166 and the corresponding location (e.g., angular position or region) 178 of the user's gaze within FOV 176.

At operation 192, projector 22 may transmit calibration pattern 184 within a region 180 of FOV 176 that is different from (e.g., separated from, non-overlapping with, away from, etc.) the identified location 178 of the user's gaze within FOV 176. This may help to obfuscate the presence of calibration pattern 184 within image light 38 from being observed by the user.

Figure 14:
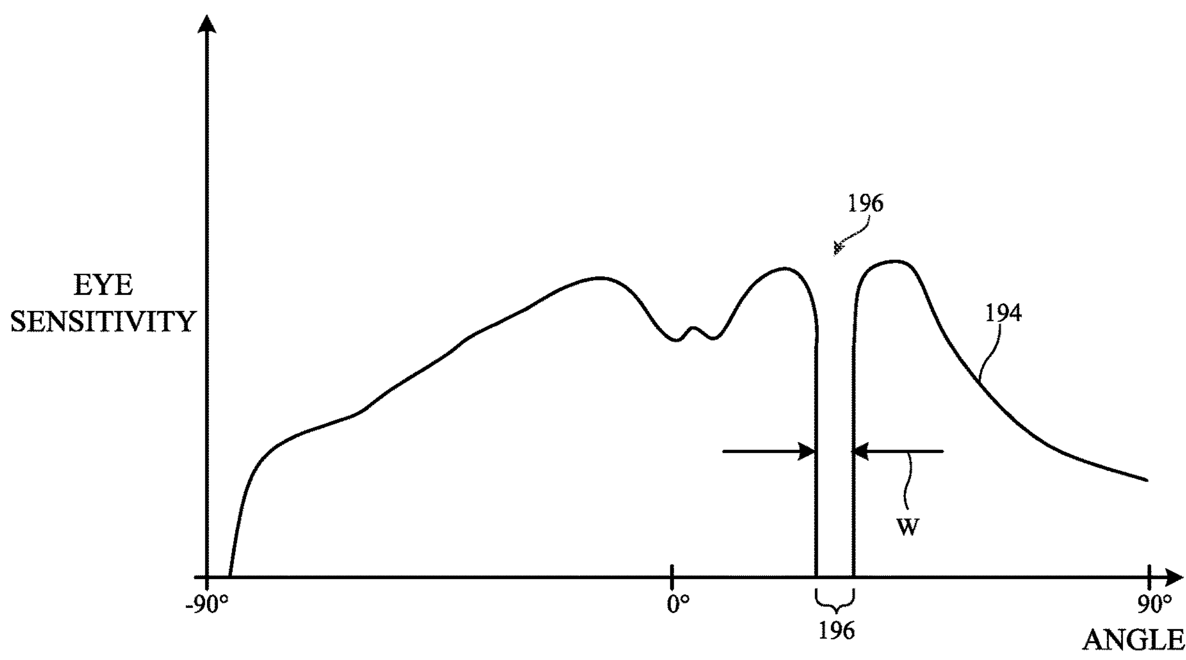
FIG. 14 is a plot of eye sensitivity as a function of angle showing how an eye exhibits a blind spot in accordance with some embodiments.

Additionally or alternatively, projector 22 may transmit calibration pattern 184 based on a blind spot of eye 156 as identified by eye tracking sensor 150. For example, projector 22 may hide calibration pattern 184 by transmitting calibration pattern 184 within the blind spot of eye 156. Curve 194 of FIG. 14 plots the sensitivity of a typical human eye as a function of angle relative to the eye's fovea (at zero degrees). As shown by curve 194, the human eye exhibits an ocular blind spot 196 (e.g., a sensitivity of zero or another sensitivity below a threshold sensitivity) at angles 196. Angles 196 may span an angular range W (e.g., 5-10 degrees). Blind spot 196 may be produced by connection of the optic nerve to the optic disk of eye 156, as the connection of the optic nerve prevents the optic disk from including photoreceptors such as rods and cones within blind spot 196.

Figure 15:
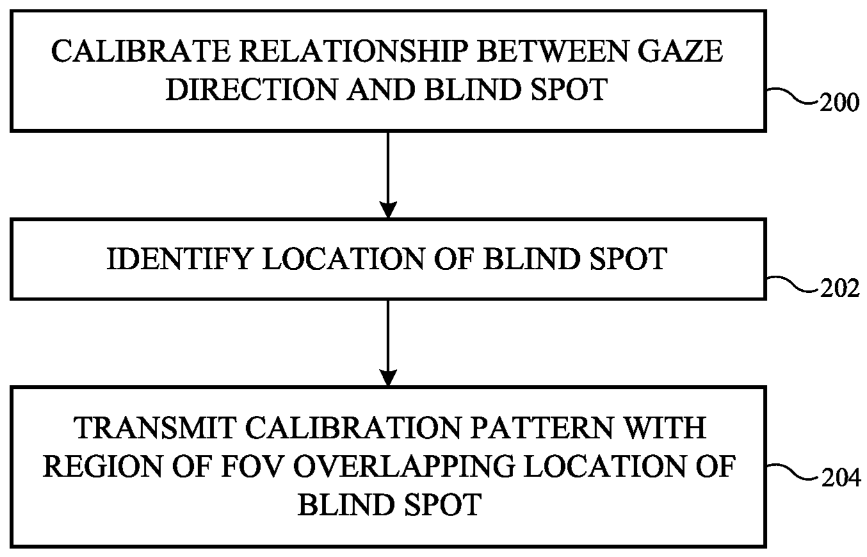
FIG. 15 is a flow chart of illustrative operations involved in transmitting a calibration pattern with a region of a field of view that overlaps the blind spot of an eye in accordance with some embodiments.

FIG. 15 is a flow chart of illustrative operations that may be performed by device 10 to transmit calibration pattern 184 within blind spot 196 of eye 156. The operations of FIG. 15 may be performed while processing operation 174 of FIG. 11, for example.

In general, different users will have different eye geometries. For example, different users may have blind spots 196 of different sizes (e.g., width W) and/or at different locations in angle space. At operation 200, eye tracking sensor 150 may perform a pre-calibration operation to identify the location of blind spot 196 for the current user of device 10. This may involve, for example, gathering IR sensor data at one or more times (e.g., while the user looks in one or more predetermined directions) to identify the location of the user's blind spot 196. The control circuitry on device 10 may identify a relationship or mapping between the user's gaze direction (e.g., gaze vector 166) and the location of their blind spot 196. In this way, subsequent measurements of the user's gaze direction may be used to identify the location of the user's blind spot (e.g., in angle space) within the eye box.

At operation 202, the control circuitry may identify the location of the user's blind spot 196 based on the sensor data generated by eye tracking sensor 150 (e.g., using the calibrated relationship between the user's gaze direction and the location of their blind spot 196).

At operation 204, projector 22 may transmit some or all of the calibration dots 186 of calibration pattern 184 within a region of FOV 176 (FIG. 12) that is located at, within, or overlapping (e.g., partially or completely overlapping) the identified location of blind spot 196. As the user's eye has no sensitivity within this region, hiding the calibration pattern within blind spot 196 may prevent the user from being able to perceive or see calibration pattern 184.

Additionally or alternatively, projector 22 may transmit calibration pattern 184 based on a blink or saccade of eye 156 as identified by eye tracking sensor 150. For example, projector 22 may hide calibration pattern 184 by synchronizing the transmission of calibration pattern 184 with a detected current or future blink or saccade of the user's eye.

Figure 16:
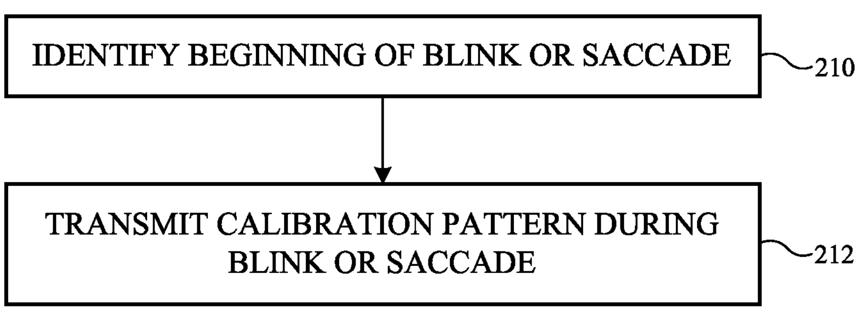
FIG. 16 is a flow chart of illustrative operations involved in transmitting a calibration pattern during a blink or a saccade of an eye in accordance with some embodiments.

FIG. 16 is a flow chart of illustrative operations that may be performed by device 10 to synchronize the transmission of calibration pattern 184 within blind spot 196 of eye 156. The operations of FIG. 15 may be performed while processing operation 174 of FIG. 11, for example.

At operation 210, the control circuitry may identify (detect) the beginning of a blink or saccade from the sensor data gathered by eye tracking sensor 150. The blink or saccade may be currently in progress or about to begin (e.g., at a future or approaching time).

At operation 212, projector 22 may transmit calibration pattern 184 during the detected blink or saccade (e.g., at a time after the detected beginning of the blink or saccade and prior to completion of the expected duration of the blink or saccade). As the user's eye is rapidly moving during a saccade or is covered by the user's eyelids during a blink, the user will be unable to see or perceive calibration pattern 184 in image light 38 at these times.

The examples of FIGS. 11-16 are illustrative and non-limiting. In general, any desired adjustments to the timing and/or positioning of some or all of calibration pattern 184 may be performed in response to any desired features of eyes 156 as captured (imaged) by eye tracking sensor 150. If desired, image data provided to projectors 22 for generating image light 38 may be adjusted based on any desired features of eyes 156 as captured by eye tracking sensor 150. If desired, two or more of the implementations of FIGS. 12-16 may be combined.

For example, projector 22 may include a first set of one or more calibration dots 186 in calibration pattern 184 at a location in FOV 176 overlapping the detected blind spot 196 (FIGS. 14 and 15) while concurrently including a second set of one or more calibration dots 186 in calibration pattern 184 at a region 180 that is located far away from the location 178 of the user's detected gaze (FIG. 12). Some or all of calibration pattern 184 may be provided at a location overlapping blind spot 196 and/or within region 180 located away from the user's gaze direction while being transmitted at a time that is synchronized with a detected saccade or blink (e.g., FIGS. 12, 13, 14, 15, and/or 16 may be combined).

The foregoing is merely illustrative and various modifications can be made to the described embodiments. The foregoing embodiments may be implemented individually or in any combination.

What is claimed is:

1. An electronic device comprising:

a projector configured to emit visible light;

a waveguide having a first optical coupler configured to couple the visible light into the waveguide and a second optical coupler configured to couple the visible light out of the waveguide;

a light source configured to emit infrared light; and an optical sensor configured to generate sensor data in response to a reflected version of the infrared light, wherein the projector is configured to transmit a dot pattern in the visible light based on the sensor data, the projector is configured to time transmission of the dot pattern in the visible light based on the sensor data, and wherein the projector is configured to synchronize the transmission of the dot pattern with a blink as identified by the sensor data.

2. The electronic device of claim 1, wherein the visible light has a field of view (FOV) and the projector is configured to locate the dot pattern within the FOV based on the sensor data.

3. The electronic device of claim 2, wherein the projector is configured to transmit the dot pattern within a region of the FOV that is separated from a gaze direction as identified by the sensor data.

4. The electronic device of claim 2, wherein the projector is configured to transmit the dot pattern within a region of the FOV that overlaps a blind spot of an eye as identified by the sensor data.

5. The electronic device of claim 1, further comprising:

a third optical coupler on the waveguide and configured to couple the visible light out of the waveguide; and an additional optical sensor configured to receive the visible light from the third optical coupler and configured to generate additional sensor data based on the dot pattern in the visible light, wherein the projector is configured to adjust the visible light based on the additional sensor data.

6. An electronic device comprising:

a gaze tracking sensor configured to transmit infrared light, receive reflected infrared light, and generate gaze information based on the reflected infrared light;

a projector configured to generate visible light, wherein the projector is configured to generate a calibration pattern in the visible light based on the gaze information, wherein the gaze information comprises information identifying a saccade and the projector is configured to synchronize generation of the calibration pattern with the saccade;

a waveguide having a first optical coupler configured to couple the visible light into the waveguide, a second optical coupler configured to couple the visible light out of the waveguide, and a third optical coupler configured to couple the visible light out of the waveguide; and an optical sensor configured to receive the visible light from the third optical coupler, wherein the optical sensor is configured to generate sensor data based on the calibration pattern and the projector is configured to adjust the visible light based on the sensor data.

7. The electronic device of claim 6, wherein the gaze information comprises a gaze direction and the projector is configured to generate the calibration pattern based on the gaze direction.

8. The electronic device of claim 7, wherein the visible light is provided to an eye box within a field of view (FOV) and the projector is configured to place the calibration pattern within a region of the FOV that is separated from the gaze direction.

9. The electronic device of claim 6, wherein the gaze information comprises a location of an ocular blind spot and the projector is configured to generate the calibration pattern based on the location of the blind spot.

10. The electronic device of claim 9, wherein the visible light has a field of view (FOV) and the projector is configured to place the calibration pattern within a region of the FOV that at least partially overlaps the location of the blind spot.

11. A method of operating an electronic device, the method comprising:

with one or more light sources, emitting infrared light;

with a first optical sensor, receiving a reflected version of the infrared light and generating first sensor data in response to the reflected version of the infrared light;

with a projector, transmitting a calibration marker in visible light based on the first sensor data, wherein transmitting the calibration marker in the visible light comprises:

identifying a blind spot based on the first sensor data, and transmitting the calibration marker at a location within a field of view (FOV) of the visible light that overlaps the blind spot;

with an input coupler, coupling the visible light into a waveguide;

with a first output coupler, coupling the visible light out of the waveguide;

with a second output coupler, directing the visible light out of the waveguide and towards a second optical sensor;

with the second optical sensor, generating second sensor data based on the calibration marker in the visible light; and with the projector, adjusting the visible light based on the second sensor data.

12. The method of claim 11, wherein transmitting the calibration marker in the visible light comprises:

identifying a gaze direction based on the first sensor data; and transmitting the calibration marker at a location within a field of view (FOV) of the visible light that is separated from the gaze direction.

13. The method of claim 11, wherein transmitting the calibration marker in the visible light comprises:

identifying a blink based on the first sensor data; and transmitting the calibration marker in the visible light during the blink.

14. The method of claim 11, wherein transmitting the calibration marker in the visible light comprises:

identifying a saccade based on the first sensor data; and transmitting the calibration marker in the visible light during the saccade.

* * * * *